(12) United States Patent
Deshpande et al.

(10) Patent No.: US 12,028,541 B2
(45) Date of Patent: *Jul. 2, 2024

(54) MOVING IMAGE ENCODING AND DECODING

(71) Applicants: SHARP KABUSHIKI KAISHA, Sakai (JP); FG Innovation Company Limited, Tuen Mun (HK)

(72) Inventors: Sachin G. Deshpande, Vancouver, WA (US); Eiichi Sasaki, Sakai (JP); Takeshi Chujoh, Sakai (JP); Yukinobu Yasugi, Sakai (JP); Tomohiro Ikai, Sakai (JP); Tomoko Aono, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,032

(22) Filed: Apr. 7, 2023

(65) Prior Publication Data

US 2023/0247213 A1 Aug. 3, 2023

Related U.S. Application Data

(63) Continuation of application No. 17/416,132, filed as application No. PCT/JP2019/050149 on Dec. 20, 2019, now Pat. No. 11,653,010.

(Continued)

(51) Int. Cl.
*H04N 19/436* (2014.01)
*H04N 19/119* (2014.01)
(Continued)

(52) U.S. Cl.
CPC ......... *H04N 19/436* (2014.11); *H04N 19/119* (2014.11); *H04N 19/167* (2014.11); *H04N 19/174* (2014.11); *H04N 19/96* (2014.11)

(58) Field of Classification Search
CPC .... H04N 19/96; H04N 19/174; H04N 19/167; H04N 19/119; H04N 19/436
See application file for complete search history.

(56) References Cited

U.S. PATENT DOCUMENTS

2013/0182774 A1   7/2013  Wang et al.
2017/0238001 A1   8/2017  Li et al.

FOREIGN PATENT DOCUMENTS

CN    104885456 A    9/2015
CN    105637864 A    6/2016
(Continued)

OTHER PUBLICATIONS

Telecommunication Standardization Sector of ITU, Recommendation ITU-T H.264, "Advanced video coding for generic audiovisual services", (Apr. 2017).

(Continued)

*Primary Examiner* — On S Mung
(74) *Attorney, Agent, or Firm* — ScienBiziP, P.C.

(57) ABSTRACT

A moving image decoding method is provided for decoding encoded data of a tile group generated by splitting a picture into one or more rectangular regions. The tile group includes one or more segments. The moving image decoding method includes decoding a wavefront parallel processing (WPP) enabled flag indicating whether a rectangular tile or a coding tree unit (CTU) row having a height of one CTU exists in a segment in an object tile group; and decoding an end bit of the segment. When the WPP enabled flag is 1, after decoding a CTU at a right end of the CTU row, an end bit of a first segment having a first fixed value is decoded. When the WPP enabled flag is 0, after decoding a CTU at a bottom right of a tile, an end bit of a second segment having a second fixed value is decoded.

9 Claims, 26 Drawing Sheets

Related U.S. Application Data

(60) Provisional application No. 62/783,640, filed on Dec. 21, 2018.

(51) Int. Cl.
*H04N 19/167* (2014.01)
*H04N 19/174* (2014.01)
*H04N 19/96* (2014.01)

(56) References Cited

FOREIGN PATENT DOCUMENTS

CN  107637081 A  1/2018
CN  108683917 A  10/2018

OTHER PUBLICATIONS

Telecommunication Standardization Sector of ITU, Recommendation ITU-T H.265, "High efficiency video coding", (Feb. 2018).

Output document approved by JVET, "Versatile Video Coding (Draft 3)", JVET-L1001-v2, Joint Video Experts Team (JVET) of ITU-T SG 16 WP 3 and ISO/IEC JTC 1/SC 29/WG 11, 12th Meeting: Macao, CN, Oct. 3-12, 2018.

Input document to JVET, "Tile groups for VVC", JVET-L0415-v1, Joint Video Experts Team (JVET) of ITU-T SG 16 WP 3 and ISO/IEC JTC 1/SC 29/WG 11, 12th Meeting: Macao, CN, Oct. 3-12, 2018.

Input document to JVET, "Spec text for the agreed starting point on slicing and tiling", JVET-L0686-v2, Joint Video Experts Team (JVET) of ITU-T SG 16 WP 3 and ISO/IEC JTC 1/SC 29/WG 11, 12th Meeting: Macao, CN, Oct. 3-12, 2018.

Non-Final Rejection dated Dec. 8, 2021 for U.S. Appl. No. 17/416,132 which is the parent application of the instant application.

Final Rejection dated Jun. 8, 2022 for U.S. Appl. No. 17/416,132 which is the parent application of the instant application.

Notice of Allowance dated Sep. 22, 2022 for U.S. Appl. No. 17/416,132 which is the parent application of the instant application.

Notice of Allowance dated Jan. 11, 2023 for U.S. Appl. No. 17/416,132 which is the parent application of the instant application.

Yanfei Shen, "High Efficiency Video Coding", Chinese Journal of Computers, vol. 36, No. 11, Nov. 15, 2013.

TILE ADDRESS (tileAddrInPic)

| TileGr0 | | TileGr1 | |
|---|---|---|---|
| Tile 0 | Tile 1 | Tile 2 | Tile 3 |
| Tile 4 | Tile 5 | Tile 6 | Tile 7 |
| TileGr2 | | TileGr3 | |
| Tile 8 | Tile 9 | Tile 10 | Tile 11 |

FIG. 6A (tileAddrInTG)

| TileGr0 | | TileGr1 | |
|---|---|---|---|
| Tile 0 | Tile 1 | Tile 4 | Tile 5 |
| Tile 2 | Tile 3 | Tile 6 | Tile 7 |
| TileGr2 | | TileGr3 | |
| Tile 8 | Tile 9 | Tile 10 | Tile 11 |

FIG. 6B

| seq_parameter_set_rbsp( ) { | DESCRIPTOR |
|---|---|
| sps_seq_parameter_set_id | ue(v) |
| chroma_format_idc | ue(v) |
| if( chroma_format_idc == 3 ) | |
|    separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_tile_groups_minus2 | ue(v) |
| log2_min_qt_size_inter_tile_groups_minus2 | ue(v) |
| max_mtt_hierarchy_depth_inter_tile_groups | ue(v) |
| max_mtt_hierarchy_depth_intra_tile_groups | ue(v) |
| sps_cclm_enabled_flag | u(1) |
| sps_temporal_mvp_enabled_flag | u(1) |
| if( sps_temporal_mvp_enabled_flag ) | |
|    sps_sbtmvp_enabled_flag | u(1) |
| if( sps_sbtmvp_enabled_flag ) | |
|    log2_sbtmvp_default_size_minus2 | u(1) |
| sps_amvr_enabled_flag | u(1) |
| sps_affine_enabled_flag | u(1) |
| if( sps_affine_enabled_flag ) | |
|    sps_affine_type_flag | u(1) |
| sps_mts_intra_enabled_flag | u(1) |
| sps_mts_inter_enabled_flag | u(1) |
| rbsp_trailing_bits( ) | |
| } | |

FIG. 11A

| pic_parameter_set_rbsp( ) { | DESCRIPTOR |
|---|---|
| pps_pic_parameter_set_id | ue(v) |
| pps_seq_parameter_set_id | ue(v) |
| transform_skip_enabled_flag | u(1) |
| single_tile_in_pic_flag | u(1) |
| if( !single_tile_in_pic_flag ) { | |
|    num_tile_columns_minus1 | ue(v) |
|    num_tile_rows_minus1 | ue(v) |
|    uniform_tile_spacing_flag | u(1) |
|    if( !uniform_tile_spacing_flag ) { | |
|      for( i = 0; i < num_tile_columns_minus1; i++ ) | |
|        tile_column_width_minus1[ i ] | ue(v) |
|      for( i = 0; i < num_tile_rows_minus1; i++ ) | |
|        tile_row_height_minus1[ i ] | ue(v) |
|    } | |
|    loop_filter_across_tiles_enabled_flag | u(1) |
| } | |
| rbsp_trailing_bits( ) | |
| } | |

FIG. 11B

| tile_group_header() { | DESCRIPTOR |
|---|---|
|    tile_group_pic_parameter_set_id | ue(v) |
|    if( NumTilesInPic > 1 ) { | |
|       tile_group_address | u(v) |
|       num_tiles_in_tile_group_minus1 | ue(v) |
|    } | |
|    tile_group_type | ue(v) |
|    ... | |
|    entry_point() | |
|    byte_alignment() | |
| } | |

FIG. 12A

| entry_point() { | DESCRIPTOR |
|---|---|
|    if( num_tiles_in_tile_group_minus1 > 0 ) { | |
|       offset_len_minus1 | ue(v) |
|       for( i = 0; i < NumEntryPoint; i++ ) | |
|          entry_point_offset_minus1[ i ] | u(v) |
|    } | |
| } | |

FIG. 12B

| tile_group_data() { | DESCRIPTOR |
|---|---|
|    tileIdx = tile_group_address | |
|    for( i=0; i<=num_tiles_in_tile_group_minus1; i++,tileIdx++ ) { | |
|       ctbAddrTs = FirstCtbAddrTs[ tileIdx ] | |
|       for (j=0; j<NumCtusInTile[tileIdx]; j++,ctbAddrTs++ ) { | |
|          ctbAddrRs = CtbAddrTsToRs[ ctbAddrTs ] | |
|          coding_tree_unit() | |
|       } | |
|       end_of_tile_one_bit  /* equal to 1 */ | ae(v) |
|       if( i < num_tiles_in_tile_group_minus1 ) | |
|          byte_alignment() | |
|    } | |
| } | |

| pic_parameter_set_rbsp( ) { | DESCRIPTOR |
|---|---|
|   pps_pic_parameter_set_id | ue(v) |
|   pps_seq_parameter_set_id | ue(v) |
|   transform_skip_enabled_flag | u(1) |
|   single_tile_group_in_pic_flag | u(1) |
|   if( !single_tile_group_in_pic_flag ) { | |
|     num_tile_group_columns_minus1 | ue(v) |
|     num_tile_group_rows_minus1 | ue(v) |
|     for( i = 0; i < num_tile_group_columns_minus1; i++ ) | |
|       tile_group_column_width_minus1[ i ] | ue(v) |
|     for( i = 0; i < num_tile_group_rows_minus1; i++ ) | |
|       tile_group_row_height_minus1[ i ] | ue(v) |
|   } | |
|   for( j = 0; j < numTileGroups; j++ ) { | |
|     single_tile_in_pic_flag[ j ] | u(1) |
|     if( !single_tile_in_pic_flag[ j ] ) { | |
|       num_tile_columns_minus1[ j ] | ue(v) |
|       num_tile_rows_minus1[ j ] | ue(v) |
|       uniform_tile_spacing_flag[ j ] | u(1) |
|       if( !uniform_tile_spacing_flag[ j ] ) { | |
|         for( i = 0; i < num_tile_columns_minus1[ j ]; i++ ) | |
|           tile_column_width_minus1[ j ][ i ] | ue(v) |
|         for( i = 0; i < num_tile_rows_minus1[ j ]; i++ ) | |
|           tile_row_height_minus1[ j ][ i ] | ue(v) |
|       } | |
|     } | |
|     loop_filter_across_tiles_enabled_flag[ j ] | u(1) |
|   } | |
|   rbsp_trailing_bits( ) | |
| } | |

FIG. 14

| NUMBER OF TILES | WAVEFRONT PROCESSING ENABLED FLAG (entropy_coding_sync_enabled_flag) | REMARK |
|---|---|---|
| > 1 (num_tiles_in_tile_group_minus1 > 0) | 0 | A PLURALITY OF TILE SEGMENTS ARE USED IN A TILE GROUP (TILE IS ENABLED) |
| = 1 (num_tiles_in_tile_group_minus1 == 0) | 1 | A CTU ROW SEGMENT IS USED IN THE TILE GROUP (WPP IS ENABLED) |
| = 1 (num_tiles_in_tile_group_minus1 == 0) | 0 | THE NUMBER OF SEGMENTS IN THE TILE GROUP IS ONE |

FIG. 16

| tile_group_header( ) { | DESCRIPTOR |
|---|---|
|   tile_group_pic_parameter_set_id | ue(v) |
|   if( NumTilesInPic > 1 ) { | |
|     tile_group_address | u(v) |
|     num_tiles_in_tile_group_minus1 | ue(v) |
|   } | |
|   if( num_tiles_in_tile_group_minus1 == 0 ) | |
|     entropy_coding_sync_enabled_flag | u(1) |
|   tile_group_type | ue(v) |
|   ... | |
|   entry_point( ) | |
|   byte_alignment( ) | |
| } | |

FIG. 18A

| entry_point( ) { | DESCRIPTOR |
|---|---|
|   NumEntryPoint = entropy_coding_sync_enabled_flag ? | |
|     TileGroupHeightInCtbsY-1 : num_tiles_in_tile_group_minus1 | |
|   if( NumEntryPoint>0 ) { | |
|     offset_len_minus1 | ue(v) |
|     for( i = 0; i < NumEntryPoint; i++ ) | |
|       entry_point_offset_minus1[ i ] | u(v) |
|   } | |
| } | |

FIG. 18B

| tile_group_data( ) { | DESCRIPTOR |
|---|---|
|   tileIdx = tile_group_address | |
|   for( i=0; i<=num_tiles_in_tile_group_minus1; i++,tileIdx++ ) { | |
|     ctbAddrTs = FirstCtbAddrTs[ tileIdx ] | |
|     for( j=0; j<NumCtusInTile[tileIdx]; j++,ctbAddrTs++ ) { | |
|       CtbAddrRs = CtbAddrTsToRs[ ctbAddrTs ] | |
|       ctbAddrInTile = ctbAddrTs-FirstCtbAddrTs[tile_group_address] | |
|       coding_tree_unit( ) | |
|       if( (entropy_coding_sync_enabled_flag && | |
|         (ctbAddrInTile+1)%TileWidthInCtbsY==0)) { | |
|         end_of_subset_one_bit | ae(v) |
|         if(j < NumCtusInTile[tileIdx]-1 || i < num_tiles_in_tile_group_minus1 ) | |
|           byte_alignment( ) | |
|       } | |
|     } | |
|   } | |
| } | |

FIG. 18C

| tile_group_header( ) { | DESCRIPTOR |
|---|---|
|    tile_group_pic_parameter_set_id | ue(v) |
|    entropy_coding_sync_enabled_flag | u(1) |
|    if( NumTilesInPic > 1 ) { | |
|      tile_group_address | u(v) |
|      if (entropy_coding_sync_enabled_flag == 0) | |
|        num_tiles_in_tile_group_minus1 | ue(v) |
|    } | |
|    tile_group_type | ue(v) |
|    ... | |
|    entry_point() | |
|    byte_alignment( ) | |
| } | |

FIG. 19

| NUMBER OF TILES | SLICE ENABLED FLAG (slice_enabled_flag) | REMARK |
|---|---|---|
| > 1 (num_tiles_in_tile_group_minus1 > 0) | 0 | A PLURALITY OF TILE SEGMENTS ARE USED IN A TILE GROUP (TILE IS ENABLED) |
| = 1 (num_tiles_in_tile_group_minus1 == 0) | 1 | A SLICE SEGMENT IS USED IN THE TILE GROUP (SLICE IS ENABLED) |
| = 1 (num_tiles_in_tile_group_minus1 == 0) | 0 | THE NUMBER OF SEGMENTS IN THE TILE GROUP IS ONE |

FIG. 20

| tile_group_header( ) { | DESCRIPTOR |
|---|---|
|   tile_group_pic_parameter_set_id | ue(v) |
|   if( NumTilesInPic > 1 ) { | |
|     tile_group_address | u(v) |
|     num_tiles_in_tile_group_minus1 | ue(v) |
|   } | |
|   if( num_tiles_in_tile_group_minus1 == 0 && | |
|     entropy_coding_sync_enabled_flag == 0 ) { | |
|     slice_enabled_flag | u(1) |
|   } | |
|   tile_group_type | |
|   ... | |
|   entry_point() | |
|   byte_alignment() | |
| } | |

FIG. 21A

| entry_point( ) { | DESCRIPTOR |
|---|---|
|   NumEntryPoint = slice_enabled_flag ? num_slices_in_tile_minus1 : | |
|     num_tiles_in_tile_group_minus1 | |
|   if( NumEntryPoint > 0 ) { | |
|     offset_len_minus1 | ue(v) |
|     for( i = 0; i < NumEntryPoint; i++ ) | |
|       entry_point_offset_minus1[ i ] | u(v) |
|   } | |
| } | |

FIG. 21B

| tile_group_data( ) { | DESCRIPTOR |
|---|---|
|   tileIdx = tile_group_address | |
|   for( i=0; i<=num_tiles_in_tile_group_minus1; i++, tileIdx++) { | |
|     ctbAddrTs = FirstCtbAddrTs[ tileIdx ] | |
|     for( j=0; j<NumCtusInTile[tileIdx]; j++, ctbAddrTs++ ) { | |
|       ctbAddrRs = CtbAddrTsToRs[ ctbAddrTs ] | |
|       coding_tree_unit() | |
|       if( slice_enabled_flag ) { | |
|         end_of_slice_segment_flag | ae(v) |
|         if( end_of_slice_segment_flag && j!=NumCtusInTile[tileIdx]-1) | |
|           byte_alignment() | |
|         } | |
|       } | |
|     } | |
|     end_of_tile_one_bit /* equal to 1 */ | ae(v) |
|     if( i <= num_tiles_in_tile_group_minus1 ) | |
|       byte_alignment() | |
|   } | |
| } | |

FIG. 21C

| NUMBER OF TILES | WAVEFRONT PROCESSING ENABLED FLAG (entropy_coding_sync_enabled_flag) | SLICE ENABLED FLAG (slice_enabled_flag) |
|---|---|---|
| > 1 (num_tiles_in_tile_group_minus1 > 0) | 0 | 0 |
| = 1 (num_tiles_in_tile_group_minus1 == 0) | 1 | 0 |
| = 1 (num_tiles_in_tile_group_minus1 == 0) | 0 | 1 |
| = 1 (num_tiles_in_tile_group_minus1 == 0) | 0 | 0 |

FIG. 22

| tile_group_header( ) { | DESCRIPTOR |
|---|---|
|   tile_group_pic_parameter_set_id | ue(v) |
|   if( NumTilesInPic > 0 ) { | |
|     tile_group_address | u(v) |
|     num_tiles_in_tile_group_minus1 | ue(v) |
|   } | |
|   if( num_tiles_in_tile_group_minus1 == 0 ) { | |
|     entropy_coding_sync_enabled_flag | u(1) |
|     if (entropy_coding_sync_enabled_flag==0) | |
|       slice_enabled_flag | u(1) |
|   } | |
|   tile_group_type | ue(v) |
|   ... | |
|   entry_point() | |
|   byte_alignment( ) | |
| } | |

FIG. 23A

| tile_group_data( ) { | DESCRIPTOR |
|---|---|
|   tileIdx = tile_group_address | |
|   for( i=0; i<=num_tiles_in_tile_group_minus1; i++,tileIdx++ ) { | |
|     ctbAddrTs = FirstCtbAddrTs[ tileIdx ] | |
|     for( j=0; j < NumCtusInTile[tileIdx]; j++, ctbAddrTs++ ) { | |
|       ctbAddrRs = CtbAddrTsToRs[ ctbAddrTs ] | |
|       ctbAddrInTile = ctbAddrTs-FirstCtbAddrTs[tile_group_address] | |
|       coding_tree_unit( ) | |
|       if( slice_enabled_flag) { | |
|         end_of_slice_segment_flag | ae(v) |
|         if (end_of_slice_segment_flag && j!=NumCtusInTile[tileIdx]-1) | |
|           byte_alignment( ) | |
|       } | |
|       else { | |
|         if( (entropy_coding_sync_enabled_flag && | |
|           (CtbAddrInTile+1)%TileWidthInCtbsY==0) \| | |
|           (j==NumCtusInTile[tileIdx]-1) ) { | |
|         end_of_subset_one_bit | ae(v) |
|         if(j < NumCtusInTile[tileIdx]-1 \| i < num_tiles_in_tile_group_minus1) | |
|           byte_alignment( ) | |
|         } | |
|       } | |
|     } | |
|   } | |
| } | |

FIG. 23B

| tile_group_data( ) { | DESCRIPTOR |
|---|---|
|   tileIdx = tile_group_address | |
|   for( i=0; i<num_tiles_in_tile_group_minus1; i++, tileIdx++ ) { | |
|     ctbAddrTs = FirstCtbAddrTs[tileIdx] | |
|     for( j=0; j<NumCtusInTile[tileIdx]; j++, ctbAddrTs++ ) { | |
|       CtbAddrRs = CtbAddrTsToRs[ ctbAddrTs ] | |
|       ctbAddrInTile = ctbAddrTs-FirstCtbAddrTs[tile_group_address] | |
|       coding_tree_unit( ) | |
|       if( entropy_coding_sync_enabled_flag && | |
|         ((ctbAddrInTile+1)%TileWidthInCtbsY==0) ) { | |
|         end_of_subset_one_bit /* equal to 1 */ | ae(v) |
|         if( j<NumCtusInTile[tileIdx]-1 ) | |
|           byte_alignment( ) | |
|       } | |
|     } | |
|     if( !entropy_coding_sync_enabled_flag ) { | |
|       end_of_tile_one_bit /* equal to 1 */ | ae(v) |
|       if( i<num_tiles_in_tile_group_minus1 ) | |
|         byte_alignment( ) | |
|     } | |
|   } | |
| } | |

FIG. 25

MOVING IMAGE ENCODING AND DECODING

CROSS-REFERENCE TO RELATED APPLICATION(S)

This application is a continuation application of U.S. patent application Ser. No. 17/416,132, filed on Jun. 18, 2021, which is a national stage application of International Patent Application PCT/JP2019/050149, filed on Dec. 20, 2019, now published as WO2020/130139, which claims the benefit of and priority to U.S. Provisional Patent Application Ser. No. 62/783,640, filed on Dec. 21, 2018. The contents of all of the above-mentioned applications are hereby incorporated herein fully by reference in their entirety.

FIELD

A solution of the present invention relates to a moving image encoding and decoding.

BACKGROUND

For the purposes of transmitting or recording moving images efficiently, a moving image encoding device is used to generate encoded data by encoding a moving image, and a moving image decoding device is used to generate a decoded image by decoding the encoded data.

Specific moving image encoding schemes include, for example, H.264/AVC, High-Efficiency Video Coding (HEVC), etc.

In such moving image encoding schemes, images (pictures) forming a moving image are managed by a hierarchical structure, and are encoded/decoded for each coding unit (CU), wherein the hierarchical structure includes slices acquired by splitting the images, coding tree units (CTUs) acquired by splitting the slices, coding units (sometimes also referred to as CUs) acquired by splitting the coding tree units, and transform units (TUs) acquired by splitting the coding units.

In addition, in such moving image encoding schemes, sometimes, a prediction image is generated on the basis of local decoded images acquired by indicating input images, and prediction errors (sometimes also referred to as "difference images" or "residual images") acquired by subtracting the prediction image from the input images (original images) are encoded. Prediction image generation methods include inter-picture prediction (inter-frame prediction) and intra-picture prediction (intra-frame prediction).

In addition, as a method in which splitting a picture into a plurality of units for transmission, a known method is to split a picture into slices, CTU rows (wavefront parallel, hereinafter referred to as segments), or tiles.

Further, moving image encoding and decoding technologies of recent years include non-patent document 1, and it is planned to associate these technologies with a tile group in which a plurality of tiles are combined into an integrated sub-stream. Non-patent document 2 discloses a technology of tile groups, and non-patent document 3 discloses a specific syntax example of the tile group.

PRIOR ART DOCUMENTS

Non-Patent Documents

Non-patent document 1: "Versatile Video Coding (Draft 3)," JVET-L1001, Joint Video Exploration Team (JVET) of ITU-T SG 16 WP 3 and ISO/IEC JTC 1/SC 29/WG 11, 2018-11-08

Non-patent document 2: "Tile groups for VVC," JVET-L0415, Joint Video Exploration Team (JVET) of ITU-T SG 16 WP 3 and ISO/IEC JTC 1/SC 29/WG 11, 2018-09-25

Non-patent document 3: "Spec text for the agreed starting point on slicing and tiling," JVET-L0686, Joint Video Exploration Team (JVET) of ITU-T SG 16 WP 3 and ISO/IEC JTC 1/SC 29/WG 11, 2018-10-12

SUMMARY

Problems to be Solved by the Invention

The following problem exists in HEVC: although HEVC corresponds to processing in which a picture is split into rectangular tiles, wavefront parallel processing (WPP) in which a picture is split into CTU rows, and processing in which a picture is split into slices of a set of continuous CTUs, for a region, the use of tiles, wavefronts, and slices is not exclusive, and therefore the processing becomes complicated. In addition, as described in non-patent documents 2 and 3, the following problem exists: there is no correspondence with the tile group; therefore, when tiles and wavefront parallelization are used, an entry point for indicating a start position of encoded data can be encoded only in units of pictures, but cannot be encoded in units of groups acquired by splitting a picture.

The following problem exists in the tiles disclosed in non-patent document 2 and non-patent document 3: the tiles can be indicated in units of groups, but the tiles do not correspond to slices that achieve efficient and high-parallel wavefront parallel processing or achieve segmentation in any position outside a rectangle. In addition, switching between categories of a segment cannot be performed in units of tile groups.

In addition, in the tiles disclosed in non-patent document 2 and non-patent document 3, a method in which a tile is split in units of pictures is defined, and therefore, the width and the height of the tile cannot be changed in units of picture groups.

Therefore, the present invention is provided for solving the above problems, and the objective thereof is to simplify and improve the efficiency of encoding processing and decoding processing by exclusively using tiles, wavefronts, and slices in a tile group. In addition, the width and the height of a tile in units of picture groups is also changeable.

Technical Solutions

In a first aspect of the present disclosure, a moving image decoding device is provided for decoding encoded data of a tile group generated by splitting a picture into one or more rectangular regions. The tile group includes one or more segments. The moving image decoding device includes a header decoding portion for decoding a wavefront parallel processing (WPP) enabled flag indicating whether a rectangular tile or a coding tree unit (CTU) row having a height of one CTU exists in a segment in an object tile group; and a coding tree (CT) information decoding portion for decoding an end bit of the segment, wherein: when the WPP enabled flag is 1, after decoding a CTU at a right end of the CTU row, the CT information decoding portion decodes an end bit of a first segment having a first fixed value, and when the WPP enabled flag is 0, after decoding a CTU at a bottom right of a tile, the CT information decoding portion decodes an end bit of a second segment having a second fixed value.

In a second aspect of the present disclosure, a moving image encoding device is provided for encoding data of a tile group generated by splitting a picture into one or more rectangular regions. The tile group includes one or more segments. The moving image encoding device includes a header encoding portion for encoding a wavefront parallel processing (WPP) enabled flag indicating whether a rectangular tile or a coding tree unit (CTU) row having a height of one CTU exists in a segment in an object tile group; and a coding tree (CT) information encoding portion for encoding an end bit of the segment, wherein when the WPP enabled flag is 1, after encoding a CTU at a right end of the CTU row, the CT information encoding portion encodes an end bit of a first segment having a first fixed value, and when the WPP enabled flag is 0, after encoding a CTU at a bottom right of a tile, the CT information encoding portion encodes an end bit of a second segment having a second fixed value.

In a third aspect of the present disclosure, a moving image decoding device is provided for decoding encoded data of a tile group generated by splitting a picture into one or more rectangular regions. The tile group includes one or more segments. When an object tile group uses a wavefront parallel processing (WPP), an end bit and a byte alignment of a segment are decoded at an end of a coding tree unit (CTU) row. When the object tile group does not use the WPP, the end bit and the byte alignment are decoded at an end of a tile.

In a fourth aspect of the present disclosure, a moving image decoding method is provided for decoding encoded data of a tile group generated by splitting a picture into one or more rectangular regions. The tile group includes one or more segments. The moving image decoding method includes: decoding a wavefront parallel processing (WPP) enabled flag indicating whether a rectangular tile or a coding tree unit (CTU) row having a height of one CTU exists in a segment in an object tile group; and decoding an end bit of the segment, wherein: when the WPP enabled flag is 1, after decoding a CTU at a right end of the CTU row, an end bit of a first segment having a first fixed value is decoded, and when the WPP enabled flag is 0, after decoding a CTU at a bottom right of a tile, an end bit of a second segment having a second fixed value is decoded.

In a fifth aspect of the present disclosure, a moving image encoding method is provided for encoding data of a tile group generated by splitting a picture into one or more rectangular regions. The tile group includes one or more segments. The moving image encoding method includes: encoding a wavefront parallel processing (WPP) enabled flag indicating whether a rectangular tile or a coding tree unit (CTU) row having a height of one CTU exists in a segment in an object tile group; and encoding an end bit of the segment, wherein when the WPP enabled flag is 1, after encoding a CTU at a right end of the CTU row, an end bit of a first segment having a first fixed value is encoded, and when the WPP enabled flag is 0, after encoding a CTU at a bottom right of a tile, an end bit of a second segment having a second fixed value is encoded.

In a sixth aspect of the present disclosure, a moving image decoding method is provided for decoding encoded data of a tile group generated by splitting a picture into one or more rectangular regions. The tile group includes one or more segments. The moving image decoding method includes: when an object tile group uses wavefront parallel processing (WPP), decoding an end bit and a byte alignment of a first segment at an end of a coding tree unit (CTU) row; and when the object tile group does not use the WPP, decoding an end bit and a byte alignment of a second segment at an end of a tile.

BRIEF DESCRIPTION OF DRAWINGS

FIGS. 6A-6B are diagrams respectively illustrating a tile group according to example embodiments of the present disclosure.

FIGS. 11A-11B are syntax tables related to tile information and the like according to example embodiments of the present disclosure.

FIGS. 12A, 12B, and 12C are diagrams showing a syntax structure of a tile group according to example embodiments of the present disclosure.

FIG. 13 is a diagram illustrating a tile group according to an example embodiment of the present disclosure.

FIG. 14 is a diagram showing a syntax structure of a picture parameter set according to an example embodiment of the present disclosure.

FIG. 16 is a diagram illustrating an exclusive structure of a tile segment and a CTU row segment according to an example embodiment of the present disclosure.

FIGS. 18A, 18B, and 18C are diagrams showing a syntax structure of a tile group according to example embodiments of the present disclosure.

FIG. 19 is a diagram showing a syntax structure of a tile group according to an example embodiment of the present disclosure.

FIG. 20 is a diagram illustrating an exclusive structure of a tile segment and a slice segment according to an example embodiment of the present disclosure.

FIGS. 21A, 21B, and 21C are diagrams showing a syntax structure of a tile group according to example embodiments of the present disclosure.

FIG. 22 is a diagram illustrating an exclusive structure of a tile segment, a CTU row segment, and a slice segment according to an example embodiment of the present disclosure.

FIGS. 23A-23B are diagrams showing a syntax structure of a tile group according to example embodiments of the present disclosure.

FIG. 25 is a diagram showing a syntax structure of a tile group according to an example embodiment of the present disclosure.

DETAILED DESCRIPTION

First Embodiment

Embodiments of the present invention are described below with reference to the accompanying drawings.

Figure 1:
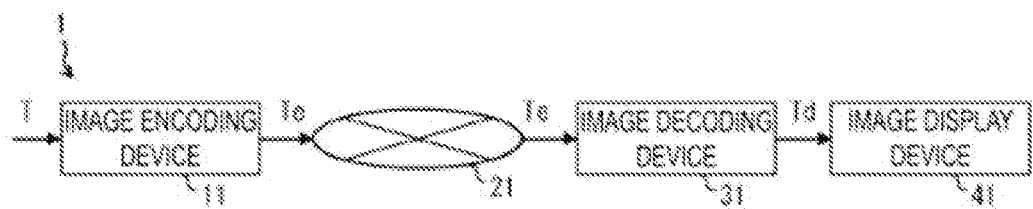
FIG. 1 is a schematic diagram showing components of an image transmission system according to an example embodiment of the present disclosure.

FIG. 1 is a schematic diagram showing components of an image transmission system 1 according to an example embodiment of the present disclosure.

The image transmission system 1 is a system for transmitting an encoded stream acquired by encoding an encoding object image, decoding the transmitted encoded stream, and displaying an image. Components of the image transmission system 1 include: a moving image encoding device (image encoding device) 11, a network 21, a moving image decoding device (image decoding device) 31, and a moving image display device (image display device) 41.

An image T is inputted to the moving image encoding device 11.

The network 21 transmits encoded streams Te generated by the moving image encoding device 11 to the moving image decoding device 31. The network 21 is the Internet, a wide area network (WAN), a local area network (LAN), or a combination thereof. The network 21 is not necessarily limited to a bidirectional communication network, and may be a unidirectional communication network for transmitting broadcast waves such as terrestrial digital broadcasting and satellite broadcasting. In addition, the network 21 may also be replaced with a storage medium in which the encoded streams Te are recorded, such as Digital Versatile Disc (DVD, registered trademark), Blue-ray Disc (BD, registered trademark), etc.

The moving image decoding device 31 decodes the encoded streams Te transmitted by the network 21 respectively to generate one or a plurality of decoded images Td.

The moving image display device 41 displays all of or part of the one or the plurality of decoded images Td generated by the moving image decoding device 31. The moving image display device 41 includes, for example, display apparatuses such as a liquid crystal display, an organic electro-luminescence (EL) display, etc. The display may be in the form of, for example, a stationary display, a mobile display, an HMD, etc. In addition, when the moving image decoding device 31 has high processing capabilities, an image having high image quality is displayed, and when the moving image decoding device 31 has only relatively low processing capabilities, an image not requiring high processing capabilities and high display capabilities is displayed.

<Operator>

The operators used in this specification are described below.

>> denotes right-shift; << denotes left-shift; & denotes bitwise AND; | denotes bitwise OR; |=denotes an OR assignment operator; || denotes logical sum.

x?y:z is a ternary operator for taking y if x is true (other than 0) and taking z if x is false (0).

Clip3(a, b, c) is a function for clipping c to a value equal to or greater than a and equal to or less than b, and returning a if c<a, returning b if c>b, and returning c otherwise (where a <=b).

abs(a) is a function for returning the absolute value of a.

Int(a) is a function for returning the integer value of a.

floor(a) is a function for returning the greatest integer equal to or less than a.

ceil(a) is a function for returning the least integer equal to or greater than a.

a/d denotes division of a by d (chop off decimal).

<Structure of the Encoded Stream Te>

Prior to detailed description of the moving image encoding device 11 and the moving image decoding device 31 according to this embodiment, a data structure of the encoded stream Te generated by the moving image encoding device 11 and decoded by the moving image decoding device 31 is described.

Figure 4:
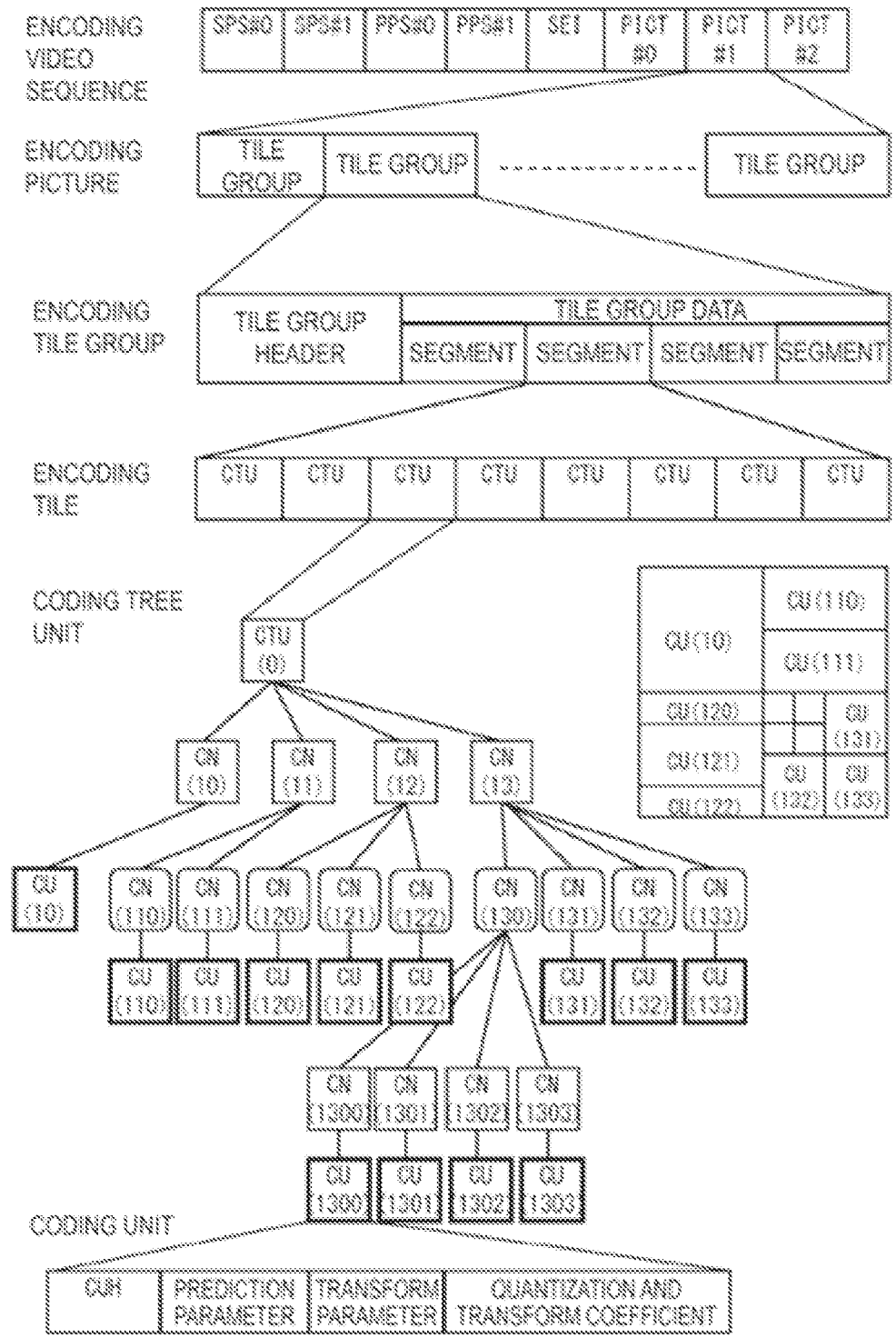
FIG. 4 is a diagram showing a hierarchical structure of data in an encoded stream according to an example embodiment of the present disclosure.

FIG. 4 is a diagram showing a hierarchical structure of data in the encoded stream Te according to an example embodiment of the present disclosure. The encoded stream Te exemplarily includes a sequence and a plurality of pictures forming the sequence. FIG. 4 is a diagram showing an encoding video sequence of a default sequence SEQ, an encoding picture defining a picture PICT, an encoding tile group defining a tile group, a segment (such as an encoding tile, a CTU row, and a slice) defining a tile, a coding tree unit included in the segment, and a coding unit included in the coding tree unit.

(Encoding Video Sequence)

In the encoding video sequence, a set of data to be referred to by the moving image decoding device 31 in order to decode the sequence SEQ of a processing object is defined. As shown in FIG. 4, the sequence SEQ includes a sequence parameter set (SPS), a picture parameter set (PPS), a picture PICT, and supplemental enhancement information (SEI).

In the sequence parameter set SPS, a set of encoding parameters referred to by the moving image decoding device 31 in order to decode an object sequence are defined. For example, information related to the width, the height, and the shape of a picture and information related to activation/deactivation of a decoding tool are defined. It should be noted that there may be a plurality of SPSs. In this case, any one of the plurality of SPSs is selected from the PPS.

In the picture parameter set PPS, a set of encoding parameters referred to by the moving image decoding device 31 in order to decode each picture in the object sequence are defined. For example, information related to the number, the width, and the height of tiles forming the picture is included. It should be noted that there may be a plurality of PPSs. In this case, any one of the plurality of PPSs is selected from each picture in the object sequence.

(Encoding Picture)

In the encoding picture, a set of data referred to by the moving image decoding device 31 in order to decode the picture PICT of the processing object is defined. As shown in FIG. 4, the picture PICT includes a tile group 0 to a tile group NTG-1 (NTG is the total number of tiles included in the picture PICT).

(Segment, Tile Group)

The segment refers to a unit for splitting and transmitting a picture, and is encoded and decoded into a bit string for byte alignment on encoded data.

The tile, the CTU row, and the slice are segments for splitting and transmitting a picture.

The segment group (tile group) refers to a group of segments serving as a set of CTUs, and can also be referred to as a segment group. It should be noted that each segment is a unit having the following characteristics and is capable of decoding in parallel.

In correspondence with the set of CTUs on the picture
Byte alignment on the encoded data
Performing CABAC initialization at a start point of the segment
Supporting prediction restriction between segments in the same picture (reference made by other segments can be restricted)

The prediction restriction refers to, for example, a restriction that intra-frame prediction of images using a tile different from an object tile is not performed when the segment is a tile. The prediction restriction also refers to a restriction that intra-frame prediction of images using a slice different from an object slice is not performed when the segment is a slice. When the segment is WPP, intra-frame prediction of part of images using a CTU row different from an object CTU row is allowed. Specifically, in WPP, a CTU row above the object CTU row can be referred to. However, in the CTU row above the object CTU row, CTUs having a horizontal coordinate exceeding a horizontal coordinate of the object CTU cannot be referred to. In addition, the reference can be on/off according to a flag.

In the tile group (segment group), by encoding a universal header in the segment only once in the segment, encoding efficiency can be improved.

Figure 5:
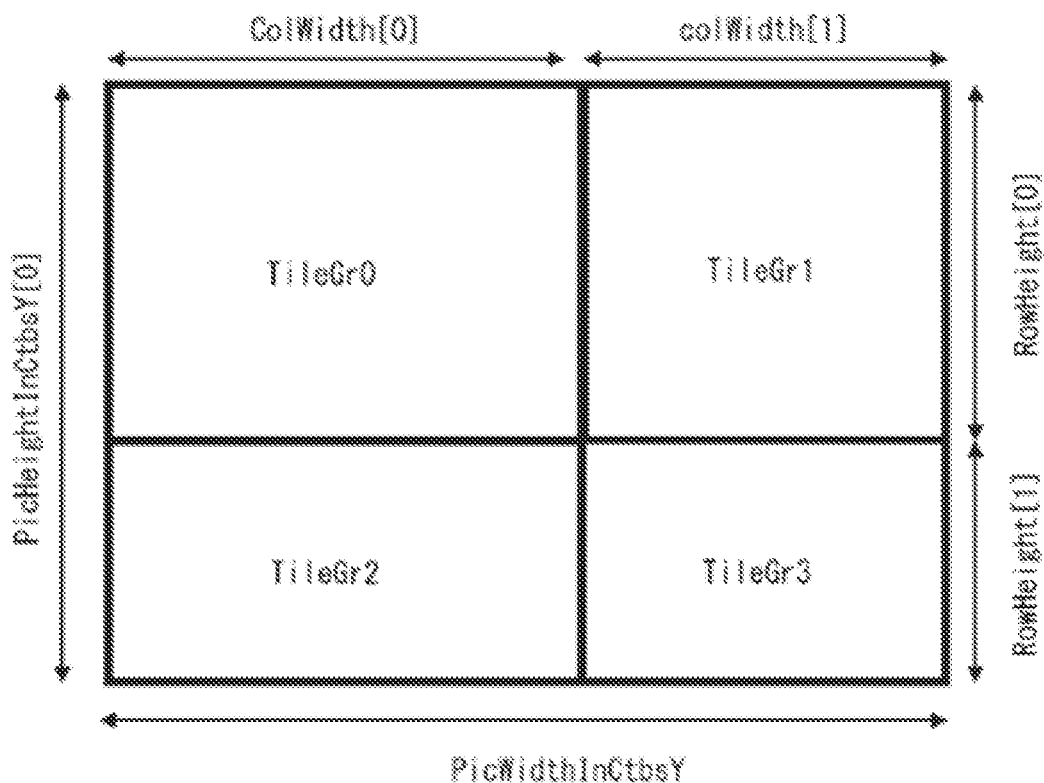
FIG. 5 is a diagram showing an example of splitting of a picture according to an example embodiment of the present disclosure.

FIG. 5 is a diagram showing an example of splitting of a picture according to an example embodiment of the present disclosure. As illustrated in FIG. 5, a picture is split into four tile groups TileGr0-TileGr3. The tile group can be further split into one or more segments. The number (0-3 in FIG. 5) of TileGr is an identifier of the tile group, and is set in a raster scanning order from the upper left to the lower right of the picture. The identifier of the tile group is a value unique to each tile group, and is a value monotonically increasing in the scanning order.

FIGS. 6A-6B are diagrams respectively illustrating a tile group according to example embodiments of the present disclosure. FIG. 6A is a diagram illustrating a tile address when the segment is a tile according to an example embodiment of the present disclosure. The number of the tile Tile in FIG. 6A is an address (TileAddrInPic) of the tile in the picture. TileAddrInPic is set in the raster scanning order from the upper left to the lower right of the picture. The tile group TileGr0 in FIG. 6A includes tiles Tile0, Tile1, Tile4, and Tile5. TileGr1 includes Tile2, Tile3, Tile6, and Tile7. TileGr2 includes Tile8 and Tile9. TileGr3 includes Tile10 and Tile11. When TileAddrInPic is used as the tile address, the tile address is not continuous in the tile group.

FIG. 6B is another diagram illustrating the tile address when the segment is a tile according to an example embodiment of the present disclosure. The number of the tile Tile in FIG. 6B is an address (TileAddrInTG) of the tile in the tile group. TileAddrInTG is set in the raster scanning order from the upper left to the lower right of the tile group. The tile group TileGr0 in FIG. 6B includes tiles Tile0, Tile1, Tile2, and Tile3. TileGr1 includes Tile4, Tile5, Tile6, and Tile7. TileGr2 includes Tile8 and Tile9. TileGr3 includes Tile10 and Tile11. When TileAddrInTG is used as the tile address, the tile address is continuous in the tile group.

(Encoding Tile Group)

In the encoding tile group, a set of data to be referred to by the moving image decoding device 31 in order to decode the tile group of the processing object is defined. As shown in FIG. 4, the tile group includes a tile group header and tile group data. In addition, trailing data (rbsp_tile_group_trailing_bits) may be included after the tile group data for byte alignment.

Figure 7:
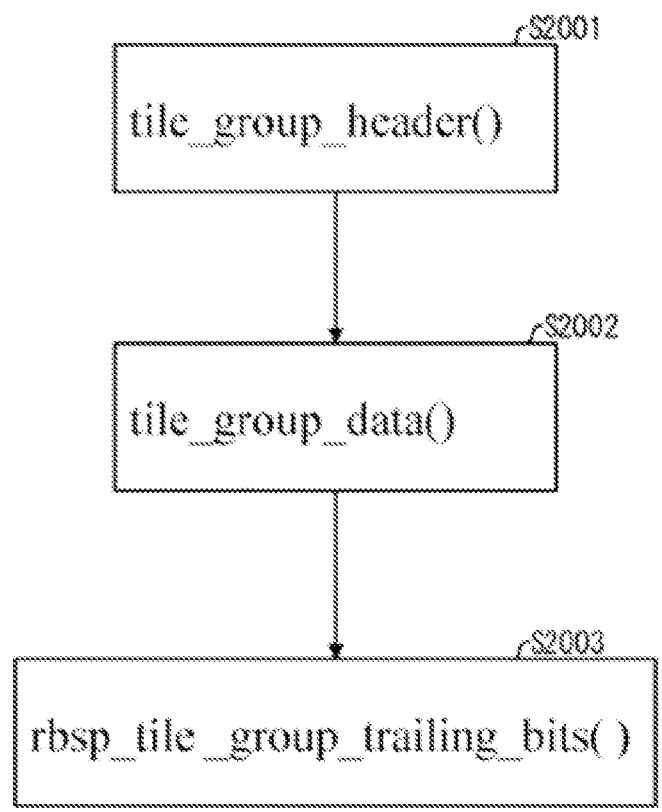
FIG. 7 is a flowchart illustrating encoding or decoding of a tile group according to an example embodiment of the present disclosure.
Figure 9:
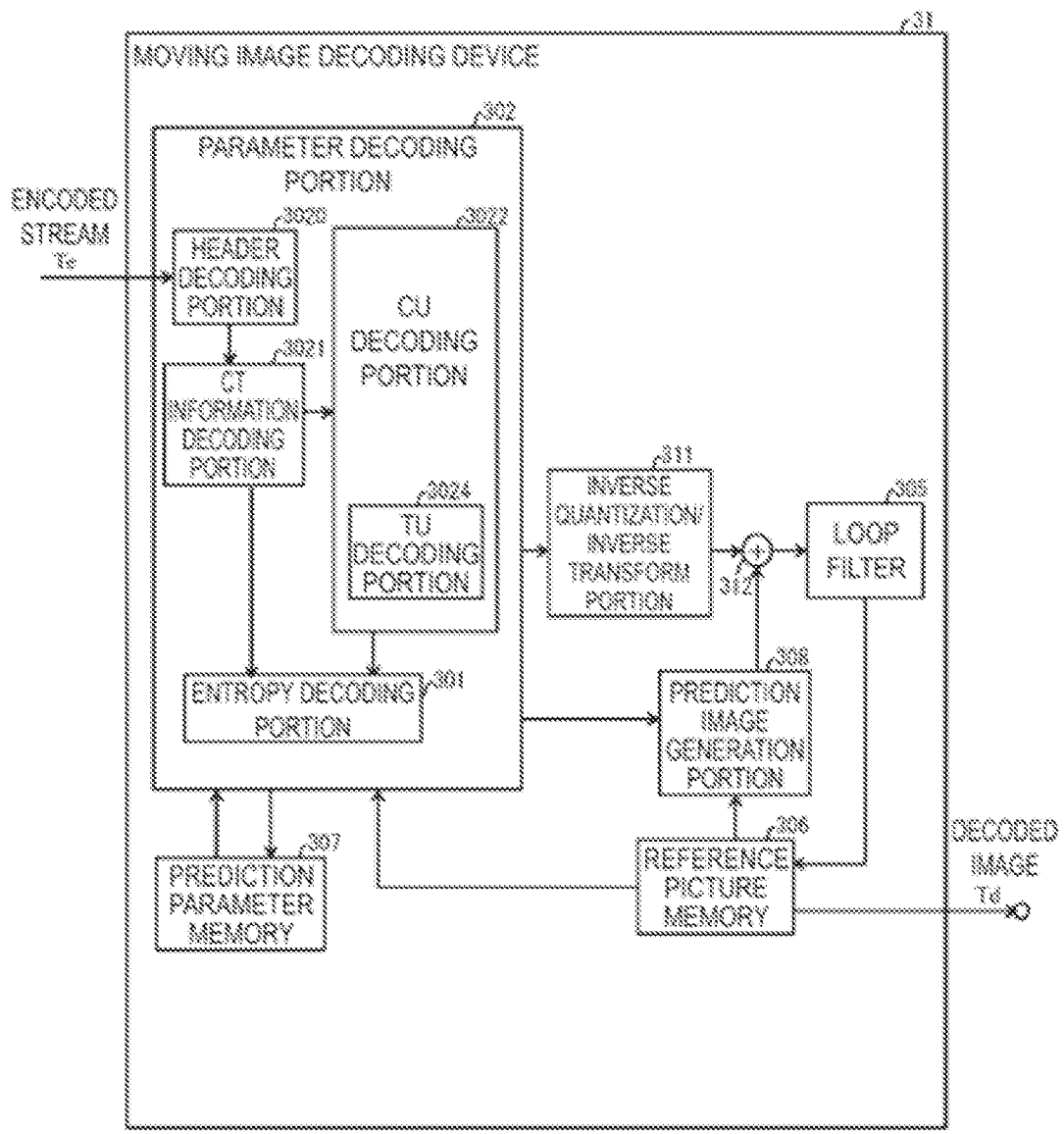
FIG. 9 is a schematic diagram showing components of a moving image decoding device according to an example embodiment of the present disclosure.
Figure 24:
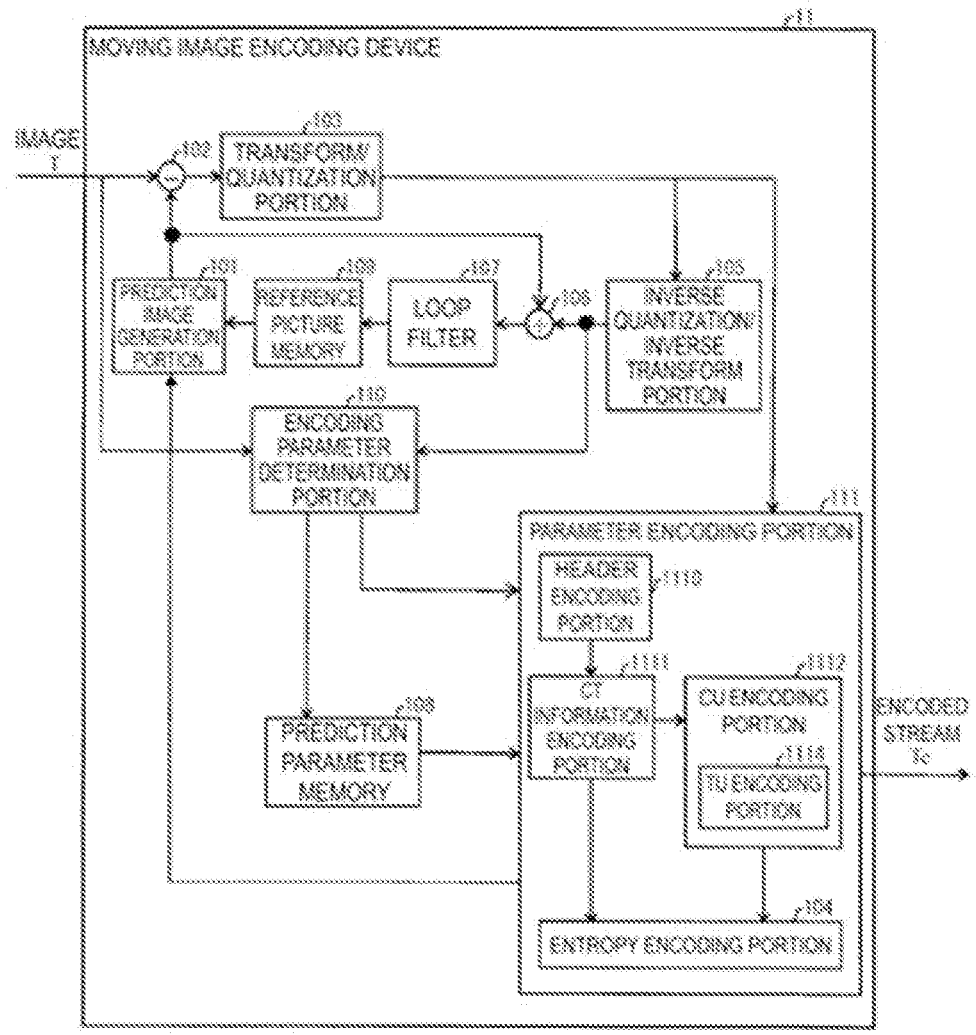
FIG. 24 is a block diagram showing components of a moving image encoding device according to an example embodiment of the present disclosure.

FIG. 7 is a flowchart illustrating encoding or decoding of the tile group according to an example embodiment of the present disclosure. Components for executing each step are disclosed in FIG. 9 and FIG. 24, and will be described below. FIG. 24 is a block diagram showing components of a moving image encoding device according to an example embodiment of the present disclosure. FIG. 9 is a schematic diagram showing components of a moving image decoding device 31 according to an example embodiment of the present disclosure.

S2001, a header encoding portion 1110 and a header decoding portion 3020 encode or decode the tile group header.

S2002, a CT information encoding portion 1111 and a CT information decoding portion 3021 encode or decode the tile group data.

S2003, the header encoding portion 1110 and the header decoding portion 3020 encode or decode the trailing data. The trailing data may include a bit string for byte alignment. In addition, after byte alignment, the trailing data may further include a bit string for indicating splitting.

The tile group header includes an encoding parameter group for determining a decoding method of an object tile group and a universal parameter in the tiles of the tile group. The tile group data consists of encoded data of one or more segments included in the tile group. The segment consists of CTUs. When the segment is a tile, the tile group data consists of one or more encoding tiles.

(Tile Group Header)

The tile group header may include tile group type designation information (tile_group_type).

Examples of tile group types that can be designated by the tile group type designation information include (1) I tile group using only intra-frame prediction during encoding, (2) P tile group using unidirectional prediction or intra-frame prediction during encoding, (3) B tile group using unidirectional prediction, bidirectional prediction, or intra-frame prediction during encoding, and the like. It should be noted that the inter-frame prediction is not limited to unidirectional prediction and bidirectional prediction, and more reference pictures can be used to generate a prediction image. P tile group and B tile group used hereinafter refer to a tile group including a block on which inter-frame prediction can be used.

It should be noted that the tile group header may include a reference (pic_parameter_set_id) to the picture parameter set PPS.

(Encoding Tile)

In the encoding tile, a set of data referred to by the moving image decoding device 31 in order to decode a tile of the processing object is defined. As shown in FIG. 4, the tile includes a CTU. The CTU is a block of a fixed size (for example, 128×128) forming a tile, and is sometimes also referred to as a largest coding unit (LCU).

(Tile, WPP, Slice)

Figure 8A:
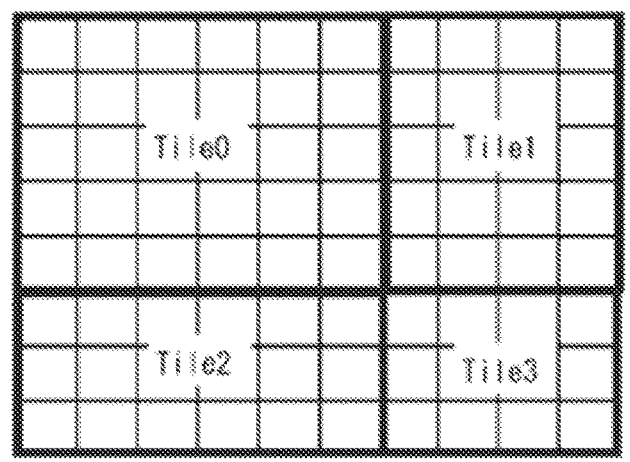
FIGS. 8A, 8B, and 8C are diagrams illustrating a tile group according to example embodiments of the present disclosure.
Figure 8B:
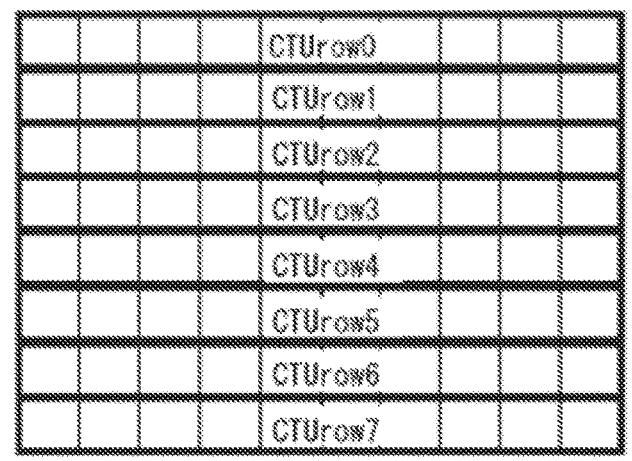
Figure 8C:
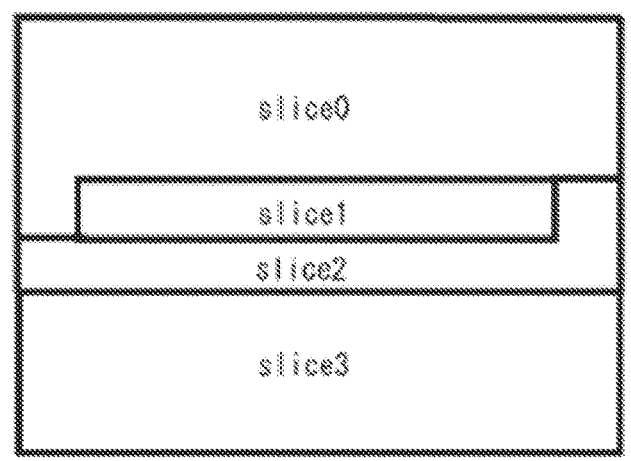

FIGS. 8A, 8B, and 8C are diagrams illustrating a tile group according to example embodiments of the present disclosure. FIG. 8A is an example of splitting the tile group TileGr0 into a plurality of tiles Tile0-Tile3 (rectangles with thick solid lines) according to an example embodiment of the present disclosure. The tile is a rectangular segment consisting of one or more CTUs. An address of each CTU (a CTU address ctbAddrTs in a tile scanning order) is set in the raster scanning order from the upper left to the lower right of each tile.

FIG. 8B is an example of splitting the tile group into a plurality of CTU rows according to an example embodiment of the present disclosure. As shown in FIG. 8B, the CTU row is a segment consisting of a set of CTUs in one row (the height thereof is the height of the CTU, and the width thereof is the width of the segment). As described below, the segment of the CTU row is used in WPP.

FIG. 8C is an example of splitting the tile group into a set of continuous CTUs according to an example embodiment of the present disclosure. As shown in FIG. 8C, the slice is a segment consisting of a set of CTUs in an encoding and decoding order.

(Coding Tree Unit)

In FIG. 4, a set of data referred to by the moving image decoding device 31 in order to decode the CTU of the processing object is defined. The CTU is split by recursive quad tree (QT) split, binary tree (BT) split, or ternary tree (TT) split into coding units (CUs) serving as a basic unit of encoding processing. The BT split and the TT split are collectively referred to as multi tree (MT) split. Nodes of a tree structure acquired by means of recursive quad tree split are referred to as coding nodes. Intermediate nodes of a quad tree, a binary tree, and a ternary tree are coding nodes, and the CTU itself is also defined as a highest coding node.

(Coding Unit)

As shown in FIG. 4, a set of data referred to by the moving image decoding device 31 in order to decode the coding unit of the processing object is defined. Specifically, the CU consists of a CU header, prediction parameters, transform parameters, quantization and transform coefficients, etc. In the CU header, a prediction mode and the like are defined.

(Components of the Moving Image Decoding Device)

Components of the moving image decoding device 31 (FIG. 9) according to the present embodiment are described.

The components of the moving image decoding device 31 include: a parameter decoding portion (prediction image decoding device) 302, a loop filter 305, a reference picture memory 306, a prediction parameter memory 307, a prediction image generation portion (prediction image generation device) 308, an inverse quantization/inverse transform portion 311, and an addition portion 312. It should be noted that according to the moving image encoding device 11 described below, the moving image decoding device 31 may not include the loop filter 305. The parameter decoding portion 302 further includes an entropy decoding portion 301, a header decoding portion 3020, a CT information decoding portion 3021, and a CU decoding portion 3022, and the CU decoding portion 3022 further includes a TU decoding portion 3024.

(Decoding Module)

Schematic operation of each module is described below. The parameter decoding portion 302 performs decoding processing on parameters such as header information, splitting information, prediction information, the quantization and transform coefficients, etc.

The entropy decoding portion 301 decodes syntax elements from binary data. More specifically, based on syntax elements provided by a provider, the entropy decoding portion 301 decodes the syntax elements from data encoded on the basis of entropy encoding schemes such as CABAC, and returns the decoded syntax elements to the provider. In examples shown below, the provider of the syntax elements is the CT information decoding portion 3021 and the CU decoding portion 3022.

(Basic Flow)

Figure 10:
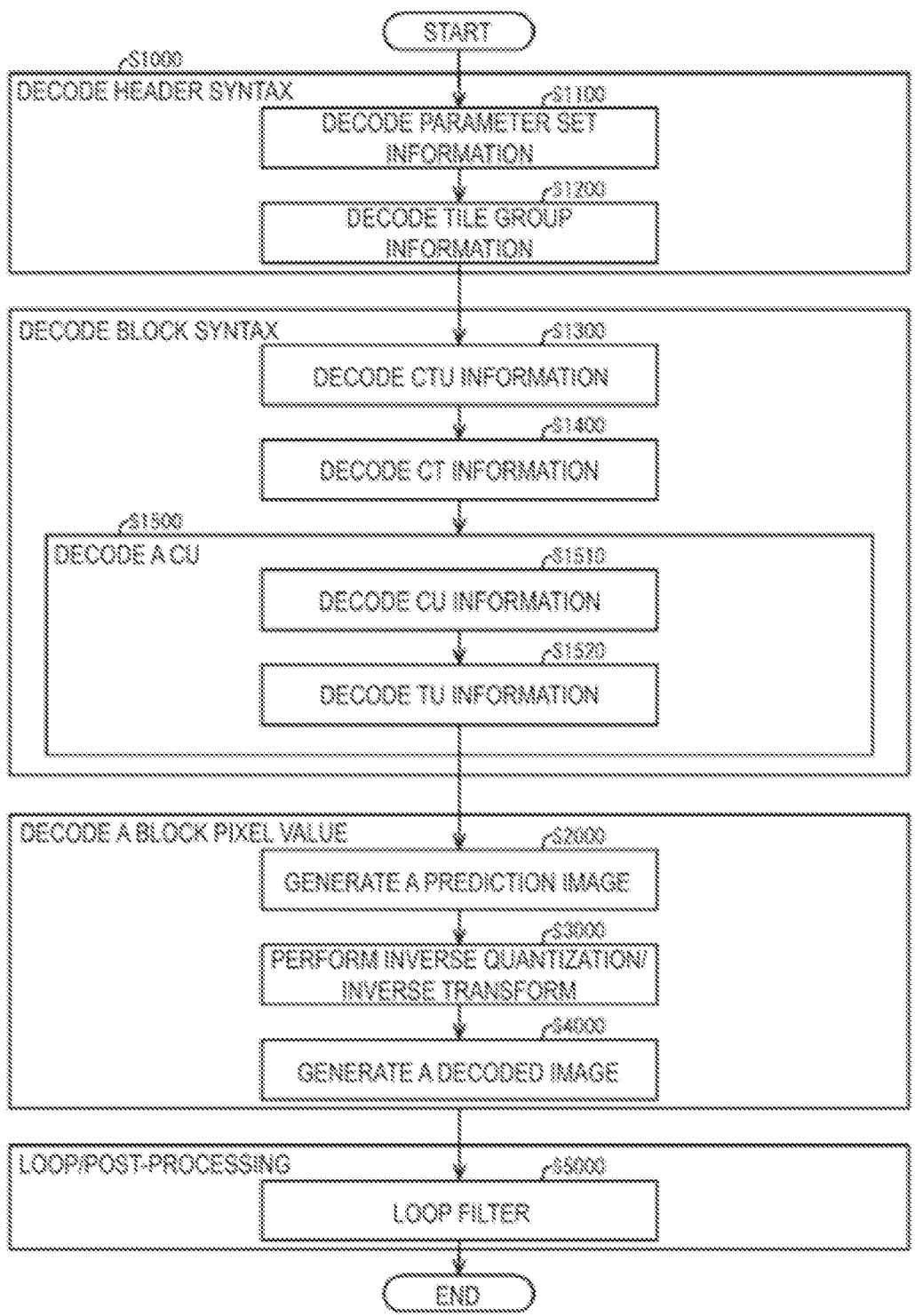
FIG. 10 is a flowchart illustrating schematic operations of a moving image decoding device according to an example embodiment of the present disclosure.

FIG. 10 is a flowchart illustrating schematic operations of the moving image decoding device 31 according to an example embodiment of the present disclosure.

(S1100, parameter set information decoding) The header decoding portion 3020 decodes parameter set information such as the SPS and the PPS and the tile information from the encoded data.

FIGS. 11A-11B are syntax tables related to tile information and the like according to example embodiments of the present disclosure. Information related to a splitting number or a size of the tile is referred to as tile information. A width ColWidth and a height RowHeight of the tile are derived by using a width PicWidthInCtbsY and a height PicHeightInCtbsY of the picture, the numbers of tiles NumTileColumns and NumTileRows in a horizontal direction and a vertical direction in the picture. ColWidth, RowHeight, PicWidthInCtbsY, and PicHeightInCtbsY are in units of CTUs. The header decoding portion 3020 uses a width pic_width_in_luma_samples and a height pic_height_in_luma_samples of a pixel unit of the picture and a value log 2_ctu_size_minus2 acquired by subtracting 2 from the logarithm of the CTU size to derive by means of the following formula. pic_width_in_luma_samples, pic_height_in_luma_samples, and log 2_ctu_size_minus2 are indicated (signaled) by means of sequence_parameter_set_rbsp( ) (referred to as an SPS) in FIG. 11A. Hereinafter, "indicating" certain piece of information means that certain piece of information is included in the encoded data (bit stream), the information is encoded in the moving image encoding device, and the information is decoded in the moving image decoding device.

$$\text{ctuWidth} = \text{ctuHeight} = 1 << (\log 2\_ctu\_size\_minus2 + 2)$$

$$\text{PicWidthInCtbsY} = \text{Ceil}(\text{pic\_width\_in\_luma\_samples} / \text{ctuWidth})$$

$$\text{PicHeightInCtbsY} = \text{Ceil}(\text{pic\_height\_in\_luma\_samples} / \text{ctuHeight})$$

Here, the division (/) uses decimal precision.

The numbers of tiles NumTileColumns and NumTileRows in the horizontal direction and the vertical direction in the picture are indicated by means of the PPS (pic_parameter_set_rbsp( )) in FIG. 11B. For example, the tile information may be single_tile_in_pic_flag, num_tile_columns_minus1, num_tile_rows_minus1, uniform_tile_spacing_flag, tile_column_width_minus1[i], and tile_row_height_minus1[i]. Here, single_tile_in_pic_flag is a flag for indicating whether a plurality of tiles exist in the picture. If single_tile_in_pic_flag is 1, then the number of tiles in the picture is one, and the picture is equivalent to a tile. If single_tile_in_pic_flag is 0, then the picture includes a plurality of tiles. num_tile_columns_minus1 and num_tile_rows_minus1 are values acquired by respectively subtracting 1 from the numbers of tiles NumTileColumns and NumTileRows in the horizontal direction and the vertical direction in the picture. uniform_spacing_flag is a flag for indicating whether to split the picture into tiles as evenly as possible.

The header decoding portion 3020 derives the numbers of tiles NumTileColumns and NumTileRows in the horizontal direction and the vertical direction in the picture, and the total number of tiles NumTilesInPic in the picture by means of the following formulas.

$$NumTileColumns=num\_tile\_columns\_minus1+1$$

$$NumTileRows=num\_tile\_rows\_minus1+1$$

$$NumTilesInPic=NumTileColumns*NumTileRows$$

The header decoding portion 3020 can derive a tile size by means of the following formulas.

for ($m=0;m<NumTileColumns;m++$)

ColWidth[$m$]=($m$+1)*PicWidthInCtbsY/NumTileColumns−$m$*PicWidthIn CtbsY/NumTileColumns for ($n=0;n<NumTileRows;n++$)

RowHeight[$n$]=($n$+1)*PicHeightInCtbsY/NumTileRows−$n$*PicHeightIn CtbsY/NumTileRows When the value of uniform_spacing_flag is 0, the width and the height of each tile of the picture are individually set. In the moving image encoding device, a width ColWidth[m] and a height RowHeight[n] of each tile are encoded for each tile. The header decoding portion 3020 of the moving image decoding device decodes ColWidth[m] and RowHeight[n] for each tile by the following manner.

ColWidth[$m$]=tile_column_width_minus1[$m$]+1
   (0<=$m$<NumTileColumns−1)

RowHeight[$n$]=tile_row_height_minus1[$m$]+1
   (0<=$n$<NumTileRows−1)

ColWidth[NumTileColumns−1]=PicWidthInCtbsY−sum_$m$(ColWidth[$m$])

RowHeight[NumTileRows−1]=PicHeightInCtbsY−sum_$n$(RowHeight[$n$])

Here, sum_m(ColWidth[m]) denotes the sum of ColWidth[m] (0<=m<NumTileColumns−1), and sum_n (RowHeight[n]) denotes the sum of RowHeight[m] (0<=NumTileRows<N−1).

(S1200, tile group information decoding) The header decoding portion 3020 decodes the tile group header (tile group information) from the encoded data.

FIGS. 12A, 12B, and 12C are diagrams showing a syntax structure of a tile group according to example embodiments of the present disclosure. FIG. 12A shows syntax for the tile group header of the encoding tile group. In the tile group header, tile_group_pic_parameter_set_id, tile_group_address, num_tiles_in_tile_group_minus1, tile_group_type, and entry_point( ) are indicated. tile_group_pic_parameter_set_id denotes a picture parameter set identifier pps_pic_parameter_set_id of a picture including the tile group. tile_group_address denotes a tile address of a first tile in the tile group, and is a value in the range of 0 to NumTilesInPic−1. The values of tile_group_address of tile groups included in the same picture are different from each other. num_tiles_in_tile_group_minus1+1 denotes the number of tiles in the tile group. tile_group_type denotes an encoding type (I tile group, P tile group, and B tile group) of the tile group. entry_point( ) is syntax of the entry point, and an example is shown in FIG. 12B.

The parameter decoding portion 302 firstly decodes tile_group_pic_parameter_set_id. Then, when the number of tiles NumTilesInPic in the tile group is greater than 1, tile_group_address and num_tiles_in_tile_group_minus1 are decoded. Otherwise (NumTilesInPic==1), tile_group_address and num_tiles_in_tile_group_minus1 are separately set to 0. Then tile_group_type is decoded.

When the tile group includes a plurality of tiles (num_tiles_in_tile_group_minus1>0), the parameter decoding portion 302 decodes offset_len_minus1 and NumEntryPoint entry points entry_point_offset_minus1[i]. When the segment is a tile, NumEntryPoint is set to num_tiles_in_tile_group_minus1. When the number of tiles in the tile group is one (num_tiles_in_tile_group_minus1=0), the parameter decoding portion 302 does not decode the entry point.

The entry point is a start point address of the segment in the encoded data (for example, a start point on encoded data of a tile group header to which an object segment belongs or a start point of an existing segment is set to be an offset position of a byte unit of a zero point), and when the segment is a tile, the entry point is a start point address of each tile. entry_point_offset_minus1[i]+1 may be a difference between an (i+1)-th entry point and an i-th entry point in the encoded data. A 0-th entry point is a start point address of the tile group header (the position of a start point of the tile group header, namely, the zero point), and is not indicated. offset_len_minus1+1 denotes the number of bits of entry_point_offset_minus1[i].

When the offset position of the byte unit in which the start point on the encoded data of the tile group header of the object segment is set to be the zero point is denoted as firstByte[k], and an offset position of a byte unit at the end of the segment is denoted as lastByte[k], firstByte[k] and lastByte[k] can be derived according to entry_point_offset_minus1 [i] by the following manner.

$$firstByte[k]=\Sigma(entry\_point\_offset\_minus1[n-1]+1)$$

Σ denotes the sum of n=1 to k.

lastByte[$k$]=firstByte[$k$]+entry_point_offset_minus1[$k$]

Hereinafter, the moving image decoding device 31 derives a decoded image of each CTU by repeatedly performing S1300 to S5000 on each CTU included in an object picture.

(S1300, CTU information decoding) The CT information decoding portion 3021 decodes the CTU from the encoded data. CT (coding tree) information includes splitting information of the coding tree.

FIG. 12C is an example of syntax for the tile group data of the encoding tile group. In the tile group data, CTU data coding_tree_unit( ) of the tile group is encoded or decoded, and an end bit end_of_tile_one_bit of a segment having a fixed value is encoded or decoded at the end of the segment.

When the segment is a tile, the CT information decoding portion 3021 decodes, by means of a CTU at the end of the tile (lower right of the tile), end_of_tile_one_bit having a fixed value, and decodes a bit string byte_alignment( ) for byte alignment. It should be noted that the decoding on byte_alignment( ) can be limited to a case in which i is less than num_tiles_in_tile_group_minus1. That is, in an end segment (i==num_tiles_in_tile_group_minus1) in the tile group, since the trailing data for byte alignment needs to be decoded later, decoding on byte_alignment( ) can be omitted.

The CT information decoding portion 3021 sets tile_group_address for tileIdx. tileIdx is an identifier of the tile, and tile_group_address is the tile address of the first tile in the tile group. tileIdx is used to identify each tile of the tile group; therefore, whenever the CT information decoding portion 3021 processes the tile, tileIdx is incremented by 1.

The CT information decoding portion 3021 uses tileIdx and FirstCtbAddrTs[ ] to derive a CTU address ctbAddrTs in the tile scanning order in the tile by means of the following formulas. Tile scanning refers to a scanning method in which processing is performed on the tile from the top left of the tile to the bottom right of the tile.

ctbAddrTs=FirstCtbAddrTs[tileIdx]

FirstCtbAddrTs[ ] is a table for converting tileIdx to a first CTU address of the tile, and is derived by the following manner.

```
for (ctbAddrTs=0, tileIdx=0, tileStartFlag=1; ctbAddrTs<PicSizeInCtbsY;
   ctbAddrTs++)  {
   if (tileStartFlag)  {
      FirstCtbAddrTs[tileIdx] = ctbAddrTs
      tileStartFlag = 0
   }
   tileEndFlag = (ctbAddTs==PicSizeInCtbsY-1) | | TileId[ctbAddrTs+
   1]!=TileId[ctbAddrTs])
   if (tileEndFlag)  {
      tileIdx++
      tileStartFlag = 1
   }
}
```

Here, TileId[ ] is a table for converting the CTU address in the tile scanning order into a tile identifier. An example is shown below.

```
for (j=0, tileIdx=0; j<=num_tile_rows_minus1; j++)
   for (i =0; i<=num_tile_columns_minus1; i++, tileIdx++)
      for (y=RowBd[j]; y<RowBd[j+1]; y++)
         for (x=ColBd[i]; x<ColBd[i+1]; x++)
            TileId[CtbAddrRsToTs[y*PicWidthInCtbsY+x]] = TileIdx
```

Here, RowBD[ ] and ColBD[ ] are tables for storing maximum coordinates in a vertical direction of each tile row and maximum coordinates in a horizontal direction of each tile column, and are in units of CTUs. An example is shown below.

```
For (RowBd[0]=0, j=0; j<=num_tile_rows_minus1; j++)
   RowBd[j+1] = RowBd[j]+RowHeight[j]
For (ColBd[0]=0, i=0; i<=num_tile_columns_minus1; i++)
   ColBd[i+1] = ColBd[i]+ColWidth[i]
```

In addition, CtbAddrRsToTs[ ] is a table for converting a CTU address in the raster scanning order in the picture into the CTU address in the tile scanning order. An example is shown below.

```
for (ctbAddrRs=0; ctbAddrRs<PicSizeInCtbsY; ctbAddrRs++)  {
   tbX = ctbAddrRs%PicWidthInCtbsY
   tbY = ctbAddrRs/PicWidthInCtbsY
   for(i=0; i<=num_tile_columns_minus1; i++)
      if(tbX>=ColBd[i]) tileX = i
   for(j=0; j<=num_tile_rows_minus1; j++)
```

-continued

```
      if (tbY>=RowBd[j]) tileY = j
   CtbAddrRsToTs[ctbAddrRs] = 0
   for(i=0; i<tileX; i++)
      CtbAddrRsToTs[ctbAddrRs] += RowHeight[tileY]*ColWidth[i]
   for(j=0; j<tileY; j++)
      CtbAddrRsToTs[ctbAddrRs] += PicWidthInCtbsY*RowHeight[j]
   CtbAddrRsToTs[ctbAddrRs] += (tbY-RowBd[tileY])*ColWidth[tileX]+
   tbX−ColBd[tileX]
}
```

The CT information decoding portion 3021 uses ctbAddrTs and CtbAddrTsToRs[ ] to derive a CTU address ctbAddrRs in the raster scanning order by means of the following formula.

ctbAddrRs=CtbAddrTsToRs[ctbAddrTs]

CtbAddrTsToRs[ ] is a table for converting the CTU address in the tile scanning order into the CTU address in the raster scanning order, and is derived by the following manner.

```
for(ctbAddrRs=0;ctbAddrRs<PicSizeInCtbsY;ct-
   bAddrRs++)

CtbAddrTsToRs[CtbAddrRsToTs[ctbAddrRs]]=ct-
   bAddrRs
```

The CT information decoding portion 3021 decodes each CTU in the tile according to the tile scanning order, and decodes end_of_tile_one_bit after completion of decoding on all of CTUs.

(S1400, CT information decoding) The CT information decoding portion 3021 decodes the CT from the encoded data.

(S1500, CU decoding) The CU decoding portion 3022 executes S1510 and S1520, and decodes the CU from the encoded data.

(S1510, CU information decoding) The CU decoding portion 3022 decodes CU information, prediction information, a TU split flag split_transform_flag, CU residual flags cbf_cb, cbf_cr, cbf_luma, etc. from the encoded data.

(S1520, TU information decoding) When a TU includes a prediction error, the TU decoding portion 3024 decodes QP update information (quantization correction value) and a quantization prediction error (residual_coding) from the encoded data. It should be noted that the QP update information is a difference value from a quantization parameter predicted value qPpred serving as a predicted value of a quantization parameter QP.

(S2000, prediction image generation) The prediction image generation portion 308 generates, on the basis of the prediction information, a prediction image for each block included in an object CU.

(S3000, inverse quantization/inverse transform portion) The inverse quantization/inverse transform portion 311 performs inverse quantization/inverse transform portion processing for each TU included in the object CU.

(S4000, decoded image generation) The adder 312 generates a decoded image of the object CU by adding the prediction image provided by the prediction image generation portion 308 and the prediction error provided by the inverse quantization/inverse transform portion 311.

(S5000, loop filtering) The loop filter 305 performs loop filtering such as de-blocking filtering, Sampling Adaptive Offset (SAO), Adaptive Loop Filtering (ALF), etc. on the decoded image to generate a decoded image.

(Modification 1) an Example of Changing the Tile Size for Each Tile Group

In the examples described above, the width and the height of the tile are designated in the picture unit (PPS); however, in modification 1, an example of flexibly setting the tile size for the tile group of each split picture is described.

Figure 13:
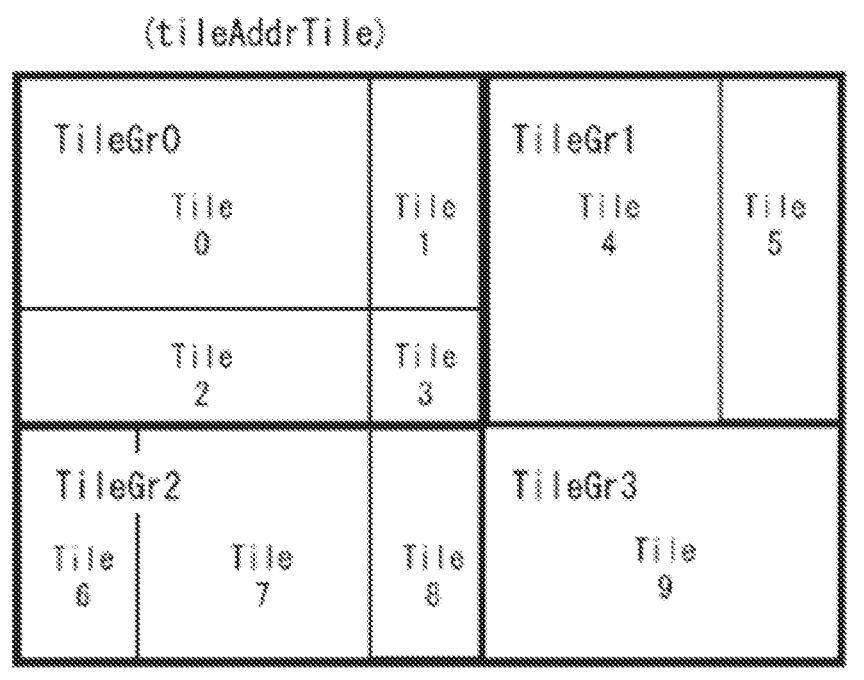

FIG. 13 is a diagram illustrating a tile group according to an example embodiment of the present disclosure. FIG. 13 illustrates an example of splitting a picture into four tile groups TileGr0-TileGr3 and then splitting the tile group into tiles. Different from tile splitting in FIGS. 6A-6B, in FIG. 13, the widths and the heights of different tiles are set for each tile group. The number of Tile in FIG. 13 is an address (TileAddrInTG) of the tile in the tile group. The tile group TileGr0 in FIG. 13 includes tiles Tile0, Tile1, Tile2, and Tile3. TileGr1 includes Tile4 and Tile5. TileGr2 includes Tile6, Tile7, and Tile8. TileGr3 includes Tile9.

An example of syntax of modification 1 is shown in FIG. 14. FIG. 14 is a diagram showing a syntax structure of a picture parameter set according to an example embodiment of the present disclosure. As shown in FIG. 14, the syntax may be, for example, single_tile_group_in_pic_flag, num_tile_group_columns_minus1, num_tile_rows_group_minus1, tile_group_column_width_minus1[i], and tile_group_row_height_minus1 [i].

Here, single_tile_group_in_pic_flag is a flag for indicating whether a plurality of tile groups exist in the picture. If single_tile_in_pic_flag is 1, then the number of tile groups in the picture is one, and the picture is equivalent to a tile group. If single_tile_in_pic_flag is 0, then the picture includes a plurality of tile groups. num_tile_group_columns_minus1 and num_tile_group_rows_minus1 are values acquired by respectively subtracting 1 from the number of tile groups NumTileGrColumns and NumTileGrRows in the horizontal direction and the vertical direction in the picture.

Then, the syntax of the tile is indicated for each tile group. For example, for each tile in a j-th tile group, single_tile_in_pic_flag[j], num_tile_columns_minus1[j], num_tile_rows_minus1[j], uniform_tile_spacing_flag[j], tile_column_width_minus1[j][i], and tile_row_height_minus1 [j][i] are indicated. The meaning of each syntax is the same as the meaning of the syntax in FIG. 11B.

The header decoding portion 3020 derives the width and the height (in units of CTUs) of the j-th tile group by the following manner.

TileGrWidthInCtbsY[$j$]=Ceil((tile_group_column_width_minus1[$j$]+1)/ctuWidth)

TileGrHeightInCtbsY[$j$]=Ceil((tile_group_height_in_luma_samples[$j$]+1)/ctuHeight)

The header decoding portion 3020 derives the number of tile groups NumTileGrColumns and NumTileGrRows in the horizontal direction and in the vertical direction in the picture, and the total number of tile groups NumTileGrsInPic in the picture by the following manner.

NumTileGrColumns=num_tile_group_columns_minus1+1

NumTileGrRows=num_tile_group_rows_minus1+1

NumTilesGrsInPic=NumTileGrColumns*NumTileGrRows

The header decoding portion 3020 derives the numbers of tiles NumTileColumns[j] and NumTileRows[j] in the horizontal direction and the vertical direction in the j-th tile group, and the total number of tiles NumTilesInPic[j] in the tile group by the following manner.

NumTileColumns[$j$]=num_tile_columns_minus1[$j$]+1

NumTileRows[$j$]=num_tile_rows_minus1[$j$]+1

NumTilesInPic[$j$]=NumTileColumns[$j$]*NumTileRows[$j$]

The header decoding portion 3020 decodes a width ColWidth[j][m] and a height RowHeight[j][n] of each tile of the j-th tile group by the following manner.

ColWidth[$j$][$m$]=tile_column_width_minus1[$j$][$m$]+1
(0<=$m$<NumTileColumns[$j$]-1)

RowHeight[$j$][$n$]=tile_row_height_minus1[$j$][$m$]+1
(0<=$n$<NumTileRows[$j$]-1)

ColWidth[$j$][NumTileColumns[$j$]-1]=TileGrWidthInCtbsY[$j$]-sum_$m$(ColWidth[$j$][$m$])

RowHeight[$j$][NumTileRows[$j$]-1]=TileGrHeightInCtbsY[$j$]-sum_$n$(RowHeight[$j$][$n$])

Here, sum_m(ColWidth[j][m]) denotes the sum of ColWidth[j][m] (0<=m<NumTileColumns[j]-1), and sum_n(RowHeight[j][n]) denotes the sum of RowHeight[j][m] (0<=NumTileRows[j]<N-1).

In modification 1, the syntax of the tile group header and the syntax of the tile group data are the same as those in FIG. 12A and FIG. 12C; however, a method for deriving the table TileId[ ] for converting the CTU address in the tile scanning order into the tile identifier is different. The method for deriving the table in modification 1 is shown below.

```
for (k=0; k<NumTileGrRows; k++)
  for ( l=0; l<NumTileGrColumns; l++)
    for (j=0, tileIdx=0; j<=num_tile_rows_minus1[k]; j++)
      for(i=0; i<=num_tile_columns_minus1[l]; i ++, tileIdx++)
        for(y=RowBd[k][j]; y<RowBd[k][j+1]; y++)
          for(x=ColBd[l][i]; x<ColBd[l][i+1]; x++)
            TileId[CtbAddrRsToTs[y*PicWidthInCtbsY+x]] = TileIdx
```

The processing other than this performed by the header decoding portion 3020 is the same as processing in the example in which the width and the height of the tile are designated by means of the PPS.

As described above, the syntax for indicating the width and the height of the tile is encoded or decoded for each tile group, so that tiles of different sizes for each tile group can be used, and tile splitting can be performed more flexibly.

(Wavefront Parallel Processing)

Wavefront parallel processing (WPP) uses CTU rows as segments, thereby suppressing reduction of encoding efficiency and achieving parallel encoding or parallel decoding of a large number of segments. Hereinafter, when the CTU row is used as the segment, WPP is used.

(Exclusive Structure in the Segment Group)

Figure 15:
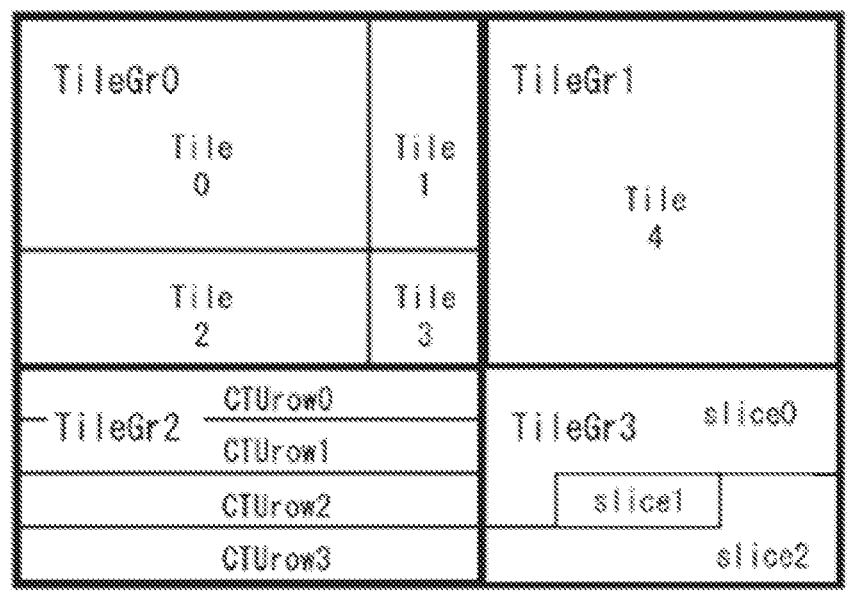
FIG. 15 is an example of using different types of segments in units of tile groups (segment groups) according to an example embodiment of the present disclosure.

FIG. 15 shows an example of using different types of segments in units of tile groups (segment groups) according to an example embodiment of the present disclosure. In the example, the tile is used as the segment in TileGr0 and TileGr1, the CTU row is used as the segment in TileGr2, and the slice is used as the segment in TileGr3.

Subsequent embodiments are characterized in that within a segment group (tile group), the type of the segment is limited to one, and the tile, the CTU row, and the slice are processed exclusively. That is, within a tile group (segment group), only one of tile segments (a plurality of tile segments), a CTU row segment, and a slice segment can be enabled. For example, within a tile group, only one of the tile and the CTU row can be enabled. In the above description, enabling the tile refers to that the tile group consists of two or more tiles (the tile group is split into two or more tiles).

(Modification 2) Processing Performed when the Tile and the CTU Row can be Used as the Segment In modification 2, a case in which the segment is any one of the tile and the CTU row and a case in which any one of the tile and the CTU is used in units of tile groups are described.

FIG. 16 is a diagram illustrating an exclusive structure of a tile segment and a CTU row segment according to an example embodiment of the present disclosure.

entropy_coding_sync_enabled_flag is a flag (WPP enabled flag) for indicating whether to set the CTU row as the segment (whether to perform WPP). It should be noted that when the CTU row is set as the segment, CABAC synchronization processing is performed. That is, in CABAC, a CABAC state at a time point when a second CTU of an upper CTU row ends is used to perform CABAC initialization on a start point CTU of the CTU row. As shown in FIG. 16, when num_tiles_in_tile_group_minus1 is greater than 0, namely, when a plurality of tiles exist, entropy_coding_sync_enabled_flag only takes 0. In the case, only the plurality of tiles are enabled. When num_tiles_in_tile_group_minus1 is 0, namely, when one tile exists, entropy_coding_sync_enabled_flag can take 1. In the case, only a plurality of CTU rows (wavefronts) are enabled. At the end, when num_tiles_in_tile_group_minus1 is 0 and entropy_coding_sync_enabled_flag is 0, the number of tiles in the tile group is one. As described below, in the case, the slice may further be enabled.

As described above, by means of the structure, an effect in which an entry point of the tile and an entry point of the wavefront can be used commonly in a tile group (within the segment group) is achieved.

In addition, an effect in which tiles (a plurality of tiles) in a certain tile group are enabled, and wavefronts in other tile groups are enabled is achieved.

In modification 2, since the exclusive structure of the tile and the wavefront needs to be implemented, when the number of tiles in the tile group is 1 (the tile group is the same as the tile, that is, a plurality of tiles are not enabled in the object tile group), the CTU row can be used as the segment by indicating the flag entropy_coding_sync_enabled_flag, and otherwise (the tile group includes a plurality of tiles) the tile is used as the segment. Therefore, the following cases exist: a case in which the picture is split into four tile groups as shown in FIG. 5; a case in which each tile group is split into a plurality of tiles as shown in FIG. 8A; a case in which each tile group is split into a plurality of CTU rows as shown in FIG. 8B; and a case in which the tile group consists of one tile (a case in which the number of tiles in the tile group is one and a case in which the CTU row is not used for splitting).

In order to encode or decode, in parallel, a plurality of tiles or a plurality of CTU rows included in the tile group, the start point address (entry point) of the tile or the CTU row is encoded or decoded by means of the tile group header.

Figure 17:
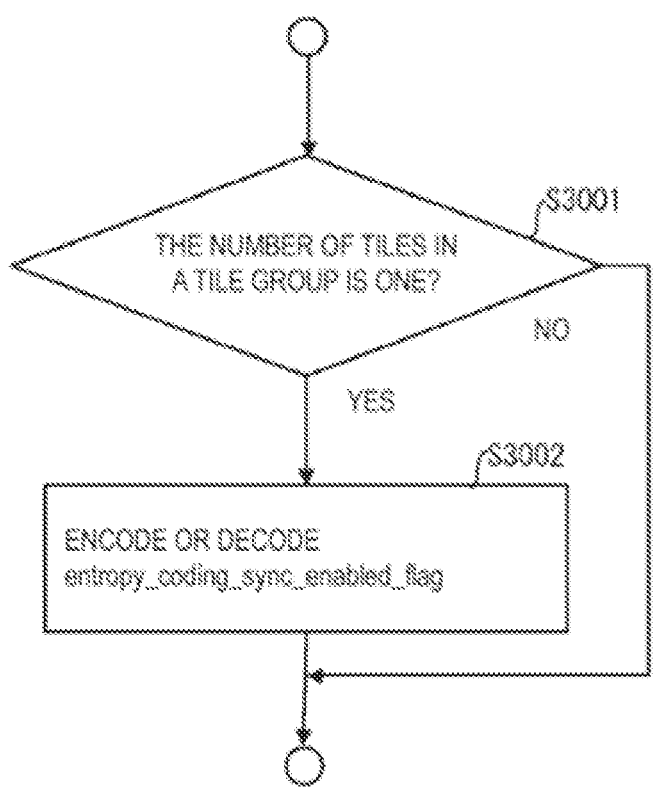
FIG. 17 is a diagram illustrating operation of a header decoding portion in an exclusive structure of a tile and a wavefront according to an example embodiment of the present disclosure.

FIG. 17 is a diagram illustrating operation of a header decoding portion in an exclusive structure of a tile and a wavefront according to an example embodiment of the present disclosure. FIGS. 18A, 18B, and 18C are diagrams showing a syntax structure of a tile group according to example embodiments of the present disclosure. FIG. 17 illustrates operation of the header encoding portion 1110 and the header decoding portion 3020 having the exclusive structure of the tile and the wavefront. FIG. 18A shows a syntax structure of the tile group header for encoding and decoding according to an example embodiment of the present disclosure.

As shown in the flowchart and the syntax structure in the figure, when num_tiles_in_tile_group_minus1 is 0 (yes in S3001), namely, when the number of tiles in the tile group is one, the header encoding portion 1110 or the header decoding portion 3020 encodes or decodes entropy_coding_sync_enabled_flag (S3002). Otherwise, entropy_coding_sync_enabled_flag is set to 0 (WPP off).

```
if (num_tiles_in_tile_group_minus1 == 0)
    entropy_coding_sync_enabled_flag
```

FIG. 18B is a diagram showing a syntax structure of the entry point according to an example embodiment of the present disclosure. In FIG. 18B, TileGrHeightInCtbsY is the height of the tile group in units of CTUs, and num_tiles_in_tile_group_minus1 is a value acquired by subtracting 1 from the number of tiles in the tile group.

The header encoding portion 1110 or the header decoding portion 3020 derives the number of entry points NumEntryPoint. When the segment included in the tile group uses WPP (when entropy_coding_sync_enabled_flag=1), the number of CTU rows included in the tile group −1 (TileGrHeightInCtbsY−1 in this case) is set as NumEntryPoint.

NumEntryPoint=TileGrHeightInCtbsY−1

Otherwise, the number of tiles included in the tile group −1 (num_tiles_in_tile_group_minus1 in this case) is set as NumEntryPoint.

NumEntryPoint=num_tiles_in_tile_group_minus1

When NumEntryPoint is greater than 0, the header encoding portion 1110 or the header decoding portion 3020 encodes or decodes entry point information (offset_len_minus1 and NumEntryPoint pieces of entry_point_offset_minus1).

FIG. 18C is a diagram showing a syntax structure of the tile group data according to an example embodiment of the present disclosure. coding_tree_unit( ) is encoded data of the CTU included in the CTU row. end_of_subset_one_bit is a flag for indicating the end of the segment.

The CT information encoding portion 1111 or the CT information decoding portion 3021 encodes or decodes coding_tree_unit( ) of the object CTU in loop processing (loop variable i) on the tiles in the tile group, and further in loop processing (loop variable j) related to the CTU in the tile.

The CT information encoding portion 1111 or the CT information decoding portion 3021 uses ctbAddrTs and FirstCtbAddrTs[ ] to derive ctbAddrInTile by means of the following formula. ctbAddrInTile is an address of an existing CTU in the tile, ctbAddrTs is an address in the tile scanning order of the existing CTU, and FirstCtbAddrTs[ ] is an address of a first CTU of the tile group.

ctbAddrInTile=ctbAddrTs−FirstCtbAddrTs[tile_group_address]

When WPP is on, the CT information encoding portion 1111 or the CT information decoding portion 3021 encodes or decodes end_of_subset_one_bit after decoding the CTU row completed. end_of_subset_one_bit is a bit inserted at the end of the CTU row. The following formula is used to determine whether a bit is at the end of the CTU row.

entropy_coding_sync_enabled_flag&&(CtbAddrIn-Tile+1)%TileWidthInCtbsY==0

That is, when (entropy_coding_sync_enabled_flag&& (CtbAddrInTile+1)%TileWidthInCtbsY==0), namely, when entropy_coding_sync_enabled_flag is 1, the CT information decoding portion 3021 decodes, at the right end of the CTU row and after the CTU is decoded, end_bit_subset_one having a fixed value. In addition, before coding_tree_unit( ) of the object CTU is encoded or decoded, when the object CTU is the start point (left end) of the CTU row, the same processing can also be performed by decoding a bit string for indicating the end of the segment (the CTU row in this case).

When j==NumCtusInTile[tileIdx]−1, namely, in the end CTU in the tile group, the CT information encoding portion 1111 or the CT information decoding portion 3021 encodes or decodes end_of_subset_one_bit having a fixed value.

In addition, except for the segment at the end of the tile group (except for a case in which the trailing data is encoded immediately), the CT information encoding portion 1111 or the CT information decoding portion 3021 decodes the bit string for byte alignment after end_of_subset_one_bit. It should be noted that j<NumCtusInTile[tileIdx]−1 is a range other than the end CTU in the segment, and i<num_tiles_in_tile_group_minus1 is a range other than the end segment; a union of the two can determine CTUs other than the end segment of the tile group.

Figure 26:
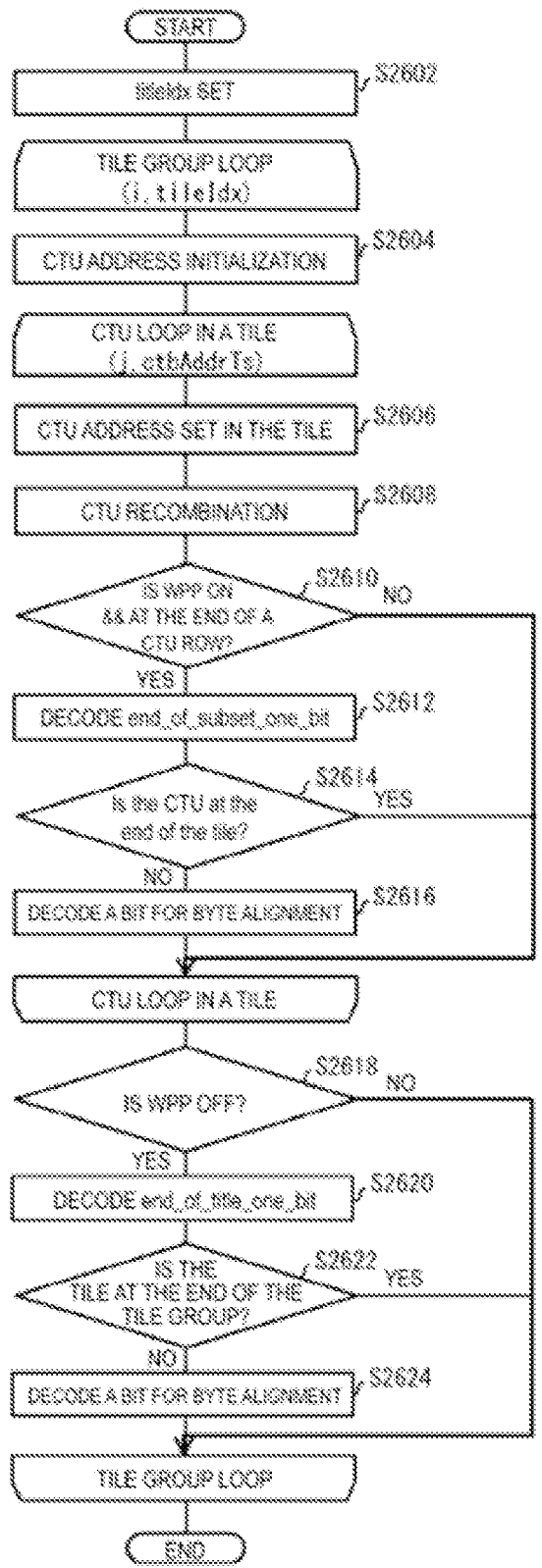
FIG. 26 is a flowchart illustrating schematic operations of a moving image decoding device according to an example embodiment of the present disclosure.

FIG. 25 is a diagram showing a syntax structure of a tile group according to an example embodiment of the present disclosure. FIG. 25 is a diagram showing another syntax structure of the tile group data in the exclusive structure of the tile and the wavefront according to an example embodiment of the present disclosure. Components of the tile group header and the entry point are the same as those in FIGS. 18(*a*) and 18(*b*). In FIG. 25, in addition to end_of_subset_one_bit serving as a segment end bit having a fixed value indicated at the end of the segment to indicate the end of WPP, end_of_tile_one_bit for indicating the end of the tile is further included. FIG. 26 is a flowchart illustrating schematic operations of a moving image decoding device according to an example embodiment of the present disclosure. FIG. 26 illustrates operation in which the CT information decoding portion 3021 decodes the syntax in FIG. 25.

An identifier of the tile is set (S2602).

S2604-S2624 are executed for each tile (loop variable i) in the tile group. It should be noted that when WPP is on, the tile group consists of one tile, and the tile group is equivalent to the tile. As described above, WPP can be on even if the tile group consists of one tile, and one tile can be used when WPP is on.

A start point CTU address of the tile group is set (S2604).

ctbAddrInTile=ctbAddrTs−FirstCtbAddrTs[tile_group_address]

In the loop processing (loop variable j) related to the CTU in the tile, a CTU address in the tile is set (S2606), and the object CTU is decoded (S2608).

For example, the following formula is used to determine whether WPP is on and whether a CTU is the CTU at the end of the CTU row (S2610).

entropy_coding_sync_enabled_flag&&((CtbAddrIn-Tile+1)%TileWidthInCtbsY)==0

When WPP is on and when the CTU is the CTU at the end of the CTU row, S2612 is executed. Otherwise, a next CTU decoding procedure is executed.

end_of_subset_one_bit is decoded (S2610). end_of_subset_one_bit is a bit inserted at the end of the CTU row.

For example, the following formula is used to determine whether a CTU is the end CTU in the tile group (S2614).

j<NumCtusInTile[tileIdx]−1

When the CTU is the CTU at the end of the tile group, a next CTU decoding procedure is executed. Otherwise, the bit string for byte alignment is decoded (S2616).

The processing of S2604-S2616 is repeated until processing on all of the CTUs in the tile ends.

It is determined whether WPP is off (S2618). When WPP is not off, the processing ends. When WPP is on, S2620 is executed.

end_of_tile_one_bit is decoded. end_of_tile_one_bit is a bit inserted at the end of the tile (S2620).

It is determined whether the tile is a tile at the end of the tile group (S2622). When the tile is the tile at the end of the tile group, the processing ends. Otherwise, the bit string for byte alignment is decoded (S2624).

The above processing is repeated until processing on all of the tiles in the tile group ends.

It should be noted that the CT information encoding portion 1111 performs processing in which "decode" in FIG. 26 is replaced with "encode."

In the processing described above, when WPP is used (entropy_coding_sync_enabled_flag==1), a bit for indicating the end of the segment and a byte alignment are inserted at the end of each CTU row, but the byte alignment is omitted in the end CTU row (j==NumCtusInTile[tileIdx]−1) equivalent to the end of the tile group. In WPP, the tile group consists of CTU rows, and therefore, the end of the tile group=the end of the CTU row. When WPP is not used (entropy_coding_sync_enabled_flag==0), a bit for indicating the end of the segment and a byte alignment are inserted at the end of the tile, but the byte alignment is omitted at the end of the tile group (i==num_tiles_in_tile_group_minus1). This is for the purpose of, as described in FIG. 4, avoiding duplication of the trailing data (rbsp_tile_group_trailing_bits) for byte alignment included after the tile group data and a byte alignment inserted in the trailing data. In a structure in which byte alignment is not performed on the trailing data, even at the end of the tile group, a byte alignment can also be inserted in the data of the tile group.

In FIG. 25 and FIG. 26, by distinguishing the bit (end_of_subset_one_bit) at the end of the CTU row inserted in the wavefront and the bit (end_of_tile_one_bit) at the end of the tile inserted in the tile, the wavefront and the tile can be clearly distinguished from each other.

As described above, by using any one of the tile and the CTU row in units of tile groups, a plurality of processing procedures having a parallel processing function can be executed exclusively in one tile group, and therefore the encoding efficiency is good. In addition, regarding the tile and the CTU row, the entry point can be used commonly; it is known whether the entry point points to the start point address of the tile or to the start point address of the CTU row for each tile group, and therefore the processing is simple.

FIG. 19 is a diagram showing a syntax structure of a tile group according to an example embodiment of the present disclosure. FIG. 19 is another example of the syntax structure of the tile group header for encoding and decoding according to an example embodiment of the present disclosure. As shown in FIG. 19, entropy_coding_sync_enabled_flag can be firstly encoded and decoded, and when entropy_coding_sync_enabled_flag is 0, namely, WPP is off, num_tiles_in_tile_group_minus1 is indicated. In the case, the header encoding portion 1110 and the header decoding portion 3020 encode or decode entropy_coding_sync_enabled_flag, and encode or decode num_tiles_in_tile_group_minus1 when NumTilesInPic is greater than 1 and entropy_coding_sync_enabled_flag is 0. Otherwise (NumTilesInPic is 1 or less, or entropy_coding_sync_enabled_flag is 1), the header encoding portion 1110 and the header decoding portion 3020 set num_tiles_in_tile_group_ minus1 to 0.

(Modification 3) Processing Performed when the Tile and the Slice can be Used as the Segment In modification 3, a case in which any one of the tile and the slice is exclusively used as the segment in the tile group is described.

FIG. 20 is a diagram illustrating an exclusive structure of a tile segment and a slice segment according to an example embodiment of the present disclosure.

slice_enabled_flag is a flag for indicating whether to set the slice to be the segment (whether to use the slice). It should be noted that CABAC is initialized at a start point of the slice. As shown in FIG. 20, when num_tiles_in_tile_group_minus1 is greater than 0, namely, when a plurality of tiles exist, slice_enabled_flag only takes 0. In the case, only the plurality of tiles are enabled. When num_tiles_in_tile_group_minus1 is 0, namely, when one tile exists, slice_enabled_flag can take 1. In the case, only the slice is enabled. At the end, when num_tiles_in_tile_group_minus1 is 0 and entropy_coding_sync_enabled_flag is 0, the number of tiles in the tile group is one. In the case, WPP can be set to be enabled.

In modification 3, when the number of tiles in the tile group is 1 (the tile group is the same as the tile), the slice can be used as the segment, and otherwise (the tile group includes a plurality of tiles), the tile is used in the segment. For example, the following cases exist: a case in which the picture is split into four tile groups as shown in FIG. 5; a case in which each tile group is split into a plurality of tiles as shown in FIG. 8A; and a case in which each tile group is split into a plurality of slices as shown in FIG. 8C. In addition, the tile group may be split into one tile. That is, when the number of tiles in the tile group is one and when splitting is not performed on the CTU row, the tile group includes one tile.

In the slice, at the end of the encoded data of the CTU, a slice end flag end_of_slice_segment_flag for indicating whether it is the end of the segment is indicated, and therefore the segment can be ended in any position in units of CTUs. The segment having a size that can be changed in units of CTUs is referred to as a slice segment. For example, the slice is used when it is desired to set splitting of the segment to be within a designated number of bits. In addition, a structure in which a mark (unique code, start code) is inserted at the start point of the slice for the purpose of parallel decoding of the slice can be used. By using the mark, the moving image decoding device can search for a start point position on a bit stream of each slice and identify the position. It should be noted that the structure in which a mark is inserted at the start point of the slice may be a structure in which the tile group is ended whenever a slice is inserted (namely, when end_of_slice_segment_flag is 1). In the structure, the tile group includes one slice, and therefore the tile group header is always attached to the start point of the slice to serve as a mark.

When encoding or decoding is performed on the start point of the slice by means of the mark, a unique code, such as "0x00000100" (32 bits), is inserted in the front of the slice, and the moving image decoding device can search for the start point of the slice in the encoded data by decoding the encoded data in advance.

In order to process the tile and the slice in parallel, the start point address (entry point) of the tile can be indicated by means of the tile group header. FIGS. 21A, 21B, and 21C are diagrams showing a syntax structure of a tile group according to example embodiments of the present disclosure. An example of the tile group header is shown in FIG. 21A. In FIG. 21A, slice_enabled_flag is indicated. slice_enabled_flag is a flag for indicating whether to perform slice splitting.

When num_tiles_in_tile_group_minus1 is 0, namely, when the tile group has one tile, the header encoding portion 1110 and the header decoding portion 3020 encode or decode slice_enabled_flag and num_slices_in_tile_minus1. Otherwise, slice_enabled_flag is set to 0 (slice off).

It should be noted that num_slices_in_tile_group_minus1 may be indicated without using the tile group header.

An encoding and decoding order of the number of tiles num_tiles_in_tile_group_minus1 and the slice enabled flag slice_enabled_flag is not limited to the above description. Processing may be performed by the following manner.
(Slice, Tile)

When the slice enabled flag slice_enabled_flag and the number of tiles num_tiles_in_tile_group_minus1 are sequentially indicated, the following processing is performed. The header encoding portion 1110 and the header decoding portion 3020 encode or decode slice_enabled_flag by means of the tile group header. When slice_enabled_flag is 0, num_tiles_in_tile_group_minus1 is encoded or decoded. When num_tiles_in_tile_group_minus1 and slice_enabled_flag are not decoded, num_tiles_in_tile_group_minus1 and slice_enabled_flag are separately set to 0.

The header encoding portion 1110 and the header decoding portion 3020 derive NumEntryPoint. NumEntryPoint is the number of entry points, and when the tile is used, num_tiles_in_tile_group_minus1 is set. When NumEntryPoint is greater than 0, the header encoding portion 1110 and the header decoding portion 3020 encode or decode the entry point information (offset_len_minus1 and NumEntryPoint pieces of entry_point_offset_minus1)

When the slice is on, the CT information decoding portion 3021 decodes end_of_slice_segment_flag after completion of decoding one CTU. end_of_slice_segment_flag illustrates a bit inserted at the end of the CTU row.

FIG. 21C illustrates an example of syntax for the tile group data of the encoding tile group. FIG. 21C shows a structure in which end_of_slice_segment_flag is encoded or decoded after completion of decoding one CTU. end_of_slice_segment_flag is a flag for indicating whether it is the end of the slice; if end_of_slice_segment_flag is 1, then it is the end of the slice, and otherwise, it is not the end of the slice.

As described above, by using any one of the tile and the slice in units of tile groups, a plurality of processing procedures having a parallel processing function can be executed exclusively in one tile group, and the efficiency is good.

(Modification 4) Processing Performed when the Slice Uses the Entry Point

The following example shows a structure in which the start point address of the slice is used as the entry point to perform encoding or decoding so as to designate a start point position of the slice on the bit stream.

In order to process the tile and the slice in parallel, the start point address (entry point) of the tile and the slice are indicated by means of the tile group header. In an example of the tile group header shown in FIG. 21A, num_slices_in_tile_minus1 may be indicated after slice_enabled_flag. num_slices_in_tile_minus1 is a value acquired by subtracting 1 from the number of slices in the tile.

In addition, the syntax of the entry point is shown in FIG. 21B. FIG. 21C shows a structure in which slice_enabled_flag and num_slices_in_tile_minus1 are used in derivation of NumEntryPoint.

When num_tiles_in_tile_group_minus1 is 0, namely, when the tile group has one tile, the header decoding portion 3020 decodes slice_enabled_flag and num_slices_in_tile_minus1. Otherwise, slice_enabled_flag is set to 0 (slice off).

The header decoding portion 3020 derives NumEntryPoint. NumEntryPoint is the number of entry points; when the slice is used, num_slices_in_tile_minus1 is set, and when the tile is used, num_tiles_in_tile_group_minus1 is set. When NumEntryPoint is greater than 0, the header decoding portion 3020 decodes the entry point information (offset_len_minus1 and NumEntryPoint pieces of entry_point_offset_minus1).

Processing procedures other than the above processing procedures are the same as those in modification 2.

Next, the tile group data is described.

FIG. 21C is an example of syntax for the tile group data of the encoding tile group. FIG. 21C shows a structure in which end_of_slice_segment_flag is encoded or decoded after completion of decoding one CTU. end_of_slice_segment_flag is a flag (bit) for indicating whether it is the end of the slice; if end_of_slice_segment_flag is 1, then it is the end of the slice, and otherwise, it is not the end of the slice.

When the slice is on, the CT information decoding portion 3021 decodes end_of_slice_segment_flag after completion of decoding one CTU.

As described above, by using any one of the tile and the slice in units of tile groups, a plurality of processing procedures having a parallel processing function can be executed exclusively in one tile group, and the efficiency is good. In addition, regarding the tile and the slice, the entry point can be used commonly; it is known whether the entry point points to the start point address of the tile or to the start point address of the slice for each tile group, and therefore the processing is simple. Alternatively, the entry point may not be used, and a unique mark is used to indicate the start point of the slice.

(Modification 5) a Segment Using the Tile, the CTU Row, and the Slice

In modification 5, an example of exclusively setting the tile, the CTU row, and the slice is described. FIG. 22 is a diagram illustrating an exclusive structure of a tile segment, a CTU row segment, and a slice segment according to an example embodiment of the present disclosure. As shown in FIG. 22, any one of the following cases is used in modification 5: a case in which the tile group includes a plurality of tile segments; a case in which the tile group includes a CTU row segment; a case in which the tile group includes a slice segment; and a case in which the tile group includes a single segment (referred to as a tile in this case).

More specifically, the structure may be a structure in which the tile is used when the tile group includes a plurality of tiles and the CTU row or the slice is used when the tile group consists of one tile. When the tile group consists of one tile and neither the CTU row nor the slice is used, the tile group is set to be one tile.

(Structure in which the Number of Tiles, the WPP Enabled Flag, and the Slice Enabled Flag are Sequentially Indicated)

FIGS. 23A-B are diagrams showing a syntax structure of a tile group according to example embodiments of the present disclosure. FIG. 23A illustrates an example of the tile group header according to an example embodiment of the present disclosure. In FIG. 23A, when the number of tiles is 1, entropy_coding_sync_enabled_flag is indicated, and when entropy_coding_sync_enabled_flag is 0 (WPP off), slice_enabled_flag is encoded or decoded.

When num_tiles_in_tile_group_minus1 is 0, the header encoding portion 1110 and the header decoding portion 3020 encode or decode entropy_coding_sync_enabled_flag. Then, when entropy_coding_sync_enabled_flag is 0, slice_enabled_flag is encoded or decoded. When num_tiles_in_tile_group_minus1 is not 0, entropy_coding_sync_enabled_flag and slice_enabled_flag are set to 0. When num_tiles_in_tile_group_minus1 is 0 and entropy_coding_sync_enabled_flag is a number other than 0, slice_enabled_flag is set to 0.

Processing procedures other than this are the same as those in the example in which the segment is only a tile.

FIG. 23B illustrates an example of syntax for the tile group data of the encoding tile group according to an example embodiment of the present disclosure. As shown in FIG. 23B, in the present embodiment, in the case in which the segment is a tile and in the case in which the segment is a CTU row (wavefront), end_of_subset_one_bit that is 1 needs to be encoded or decoded at the end of the segment, and in the case in which the segment is a slice, end_of_slice_segment_flag that can take 0 and 1 to indicate whether the CTU is the end of the segment is encoded or decoded. The method for encoding or decoding end_of_subset_one_bit has been described in FIG. 18C, and therefore description thereof is omitted. In addition, the method for encoding or decoding end_of_slice_segment_flag has been described in FIG. 21C, and therefore description thereof is omitted.

As described above, by exclusively using the tile, the CTU row, and the slice in units of tile groups, encoding and decoding processing on the segment can be simplified. In addition, an effect in which the start point and the end of the segment can be clearly determined is achieved. For example, a conflict in which the start point of the slice, the start point of the tile, and the start point of the CTU row simultaneously exist would not occur.

An encoding and decoding order of the number of tiles num_tiles_in_tile_group_minus1, the WPP enabled flag entropy_coding_sync_enabled_flag, and the slice enabled flag slice_enabled_flag is not limited to the above description. Processing may be performed by the following manner.

(Tile, Slice, WPP)

When num_tiles_in_tile_group_minus1, slice_enabled_flag, and entropy_coding_sync_enabled_flag are sequentially indicated, the following processing is performed. The header encoding portion 1110 and the header decoding portion 3020 encode or decode num_tiles_in_tile_group_minus1. When num_tiles_in_tile_group_minus1 is 0, slice_enabled_flag is encoded or decoded. Then, when slice_enabled_flag is 0, entropy_coding_sync_enabled_flag is encoded or decoded. When num_tiles_in_tile_group_minus1, entropy_coding_sync_enabled_flag, and slice_enabled_flag are not decoded, num_tiles_in_tile_group_minus1, entropy_coding_sync_enabled_flag, and slice_enabled_flag are separately set to 0.

(WPP, Tile, Slice)

When entropy_coding_sync_enabled_flag, num_tiles_in_tile_group_minus1, and slice_enabled_flag are sequentially indicated, the following processing is performed. The header encoding portion 1110 and the header decoding portion 3020 encode or decode entropy_coding_sync_enabled_flag by means of the tile group header. When entropy_coding_sync_enabled_flag is 0, num_tiles_in_tile_group_minus1 is encoded or decoded. Then, when num_tiles_in_tile_group_minus1 is 0, slice_enabled_flag is encoded or decoded. When num_tiles_in_tile_group_minus1, entropy_coding_sync_enabled_flag, and slice_enabled_flag are not decoded, num_tiles_in_tile_group_minus1, entropy_coding_sync_enabled_flag, and slice_enabled_flag are separately set to 0.

(WPP, Slice, Tile)

When entropy_coding_sync_enabled_flag, slice_enabled_flag, and num_tiles_in_tile_group_minus1 are sequentially indicated, the following processing is performed. The header encoding portion 1110 and the header decoding portion 3020 encode or decode entropy_coding_sync_enabled_flag by means of the tile group header. When entropy_coding_sync_enabled_flag is 0, slice_enabled_flag is encoded or decoded. Then, when slice_enabled_flag is 0, num_tiles_in_tile_group_minus1 is encoded or decoded. When num_tiles_in_tile_group_minus1, entropy_coding_sync_enabled_flag, and slice_enabled_flag are not decoded, num_tiles_in_tile_group_minus1, entropy_coding_sync_enabled_flag, and slice_enabled_flag are separately set to 0.

(Slice, Tile, WPP)

When slice_enabled_flag, num_tiles_in_tile_group_minus1, and entropy_coding_sync_enabled_flag are sequentially indicated, the following processing is performed. The header encoding portion 1110 and the header decoding portion 3020 encode or decode slice_enabled_flag by means of the tile group header. When slice_enabled_flag is 0, num_tiles_in_tile_group_minus1 is encoded or decoded. Then, when num_tiles_in_tile_group_minus1 is 0, entropy_coding_sync_enabled_flag is encoded or decoded. When num_tiles_in_tile_group_minus1, entropy_coding_sync_enabled_flag, and slice_enabled_flag are not decoded, num_tiles_in_tile_group_minus1, entropy_coding_sync_enabled_flag, and slice_enabled_flag are separately set to 0.

(Slice, WPP, Tile)

When slice_enabled_flag, entropy_coding_sync_enabled_flag, and num_tiles_in_tile_group_minus1 are sequentially indicated, the following processing is performed. The header encoding portion 1110 and the header decoding portion 3020 encode or decode slice_enabled_flag by means of the tile group header. When slice_enabled_flag is 0, entropy_coding_sync_enabled_flag is encoded or decoded. Then, when entropy_coding_sync_enabled_flag is 0, num_tiles_in_tile_group_minus1 is encoded or decoded. When num_tiles_in_tile_group_minus1, entropy_coding_sync_enabled_flag, and slice_enabled_flag are not decoded, num_tiles_in_tile_group_minus1, entropy_coding_sync_enabled_flag, and slice_enabled_flag are separately set to 0.

The entropy decoding portion 301 outputs an inter-frame prediction parameter to the inter-frame prediction parameter decoding portion. In addition, an intra-frame prediction parameter is outputted to the intra-frame prediction parameter decoding portion. In addition, a quantization and transform coefficient is outputted to the inverse quantization/inverse transform portion 311.

The entropy decoding portion 301 includes a CABAC initialization portion, a CABAC decoding portion, an initialization table, and a spatial prediction storage portion (including an internal spatial prediction table). The spatial prediction storage portion 3015 stores a CABAC state in the internal spatial prediction table 3016. The stored CABAC state is for reference during decoding of segments other than the object segment such as a subsequent segment of the object picture, and is used for initialization of the CABAC state. The CABAC decoding portion 3012 decodes the syntax from the encoded data (bit stream) according to the internally stored CABAC state.

The entropy decoding portion 301 uses the CABAC initialization portion 3011 at the start point of the segment to initialize the CABAC state. The CABAC state refers to, for example, StateIdx for indicating a status of a probability of a context unit, MpsVal for indicating whether 0 or 1 has a high probability, a coefficient StatCoeff, etc. Context is determined according to elements of a binary string forming the syntax (a string consisting of 0 and 1). CABAC (context-adaptive binary arithmetic coding) refers to inferring, according to the context, a probability that a code is 0 or 1 and encoding the binary on the basis of the probability, which can achieve high-efficiency encoding. In this case, an initial value of the probability StateIdx (and the binary Mps for indicating a high probability) needs to be set, which is referred to as CABAC initialization. TableStateIdx, TableMpsVal, and TableStatCoeff are tables consisting of StateIdx, MpsVal, and StatCoeff.

When the segment is a tile, the CABAC initialization portion 3011 uses an upper left CTU of the rectangular tile as a decoding start time point (a boundary time point of the tile), and uses the initialization table to initialize the CABAC state. When the segment is a CTU row (entropy_coding_sync_enabled_flag is 1, and in the case of WPP), at a left end of the CTU row, the CABAC state stored in the spatial prediction storage portion 3015 is used to perform initialization. In the case of WPP, a CABAC state of a second CTU of each CTU row is stored in the spatial prediction storage portion 3015, and is used in subsequent segments. When the segment is a slice (slice_enabled_flag is 1), the initialization table can be used to initialize the CABAC state. Here, determination on a tile boundary may be based on whether identifiers of tiles of adjacent CTUs are different (TileId[CtbAddrTs]!=TileId[CtbAddrTs-1]). Here, determination on the left end of the CTU row may be (CtbAddrInTile%TileWidthInCtbsY==0). In addition, determination on the start point of the slice may be based on whether the CTU address CtbAddrRs is consistent with a CTU address of the start point of the slice (CtbAddrRs==slice_segment_address).

The loop filter 305 is a filter provided in an encoding loop, and is a filter for eliminating block distortion and ringing distortion to improve image quality. The loop filter 305 performs filtering such as de-blocking filtering, Sampling Adaptive Offset (SAO), and Adaptive Loop Filtering (ALF) on the decoded image of the CU generated by the addition portion 312.

The reference picture memory 306 stores the decoded image of the CU generated by the addition portion 312 in a predefined position for each object picture and each object CU.

The prediction parameter memory 307 stores the prediction parameters in a predefined position for the CTU or the CU of each decoded object. Specifically, the prediction parameter memory 307 stores the parameters decoded by the parameter decoding portion 302, the prediction mode predMode separated by the entropy decoding portion 301, etc.

The prediction mode predMode, the prediction parameters, etc., are inputted into the prediction image generation portion 308. In addition, the prediction image generation portion 308 reads the reference picture from the reference picture memory 306. The prediction image generation portion 308 uses, in a prediction mode indicated by the prediction mode predMode, the prediction parameters and the read reference picture (reference picture block) to generate a prediction image of the block or the sub-block. Here, the reference picture block refers to a collection (generally a rectangle, and therefore it is referred to as a block) of pixels on the reference picture, and is a region referenced for prediction image generation.

The inverse quantization/inverse transform portion 311 inversely quantizes the quantization and transform coefficient inputted from the entropy decoding portion 301 to acquire a transform coefficient. The quantization and transform coefficient is a coefficient acquired by performing frequency transform and quantization such as discrete cosine transform (DCT), etc., on the prediction error in the encoding processing. The inverse quantization/inverse transform portion 311 performs inverse frequency transform such as inverse DCT, etc., on the acquired transform coefficient to calculate the prediction error. The inverse quantization/inverse transform portion 311 outputs the prediction error to the addition portion 312.

The addition portion 312 adds the prediction image of the block inputted from the prediction image generation portion 308 to the prediction error inputted from the inverse quantization/inverse transform portion 311 for each pixel to generate a decoded image of the block. The addition portion 312 stores the decoded image of the block in the reference picture memory 306, and outputs the same to the loop filter 305.

(Components of the Moving Image Encoding Device)

Next, components of the moving image encoding device 11 according to this embodiment are described. FIG. 24 is a block diagram showing components of the moving image encoding device 11 according to the present embodiment. The moving image encoding device 11 is configured to include: a prediction image generation portion 101, a subtraction portion 102, a transform/quantization portion 103, an inverse quantization/inverse transform portion 105, an addition portion 106, a loop filter 107, a prediction parameter memory 108, a reference picture memory 109, an encoding parameter determination portion 110, a parameter encoding portion 111, and an entropy encoding portion 104.

The prediction image generation portion 101 generates a prediction image according to regions formed by splitting each picture of each image T, namely, according to the CU. The prediction image generation portion 101 performs the same action as the prediction image generation portion 308 described above.

The subtraction portion 102 subtracts a pixel value of the prediction image of the block inputted from the prediction image generation portion 101 from a pixel value of the image T to generate a prediction error. The subtraction portion 102 outputs the prediction error to the transform/quantization portion 103.

The transform/quantization portion 103 calculates a transform coefficient by performing frequency transform on the prediction error inputted from the subtraction portion 102, and derives a quantization and transform coefficient by means of quantization. The transform/quantization portion 103 outputs the quantization and transform coefficient to the entropy encoding portion 104 and the inverse quantization/inverse transform portion 105.

The inverse quantization/inverse transform portion 105 is the same as the inverse quantization/inverse transform portion 311 (FIG. 9) in the moving image decoding device 31. The calculated prediction error is inputted to the addition portion 106.

The parameter encoding portion 111 includes: a header encoding portion 1110, a CT information encoding portion 1111, a CU encoding portion 1112 (prediction mode encoding portion), an entropy encoding portion 104, and an inter-frame prediction parameter encoding portion and an intra-frame prediction parameter encoding portion not shown in the figure. The CU encoding portion 1112 further includes a TU encoding portion 1114.

Schematic operation of each module is described below. The parameter encoding portion 111 performs encoding processing on parameters such as header information, the splitting information, prediction information, the quantization and transform coefficient, etc.

The CT information encoding portion 1111 encodes QT splitting information, MT (BT, TT) splitting information, etc.

The CU encoding portion 1112 encodes the CU information, the prediction information, the TU split flag, the CU residual flag, etc.

When the TU includes the prediction error, the TU encoding portion 1114 encodes QP update information (quantization correction value) and a quantization prediction error (residual_coding).

The entropy encoding portion 104 converts the syntax elements provided by the provider into binary data, generates encoded data by means of entropy encoding schemes such as CABAC, and outputs the same. In an example shown in FIG. 24, the provider of the syntax elements is the CT information encoding portion 1111 and the CU encoding portion 1112.

The addition portion 106 adds the pixel value of the prediction image of the block inputted from the prediction image generation portion 101 to the prediction error inputted from the inverse quantization/inverse transform portion 105 for each pixel so as to generate a decoded image. The addition portion 106 stores the generated decoded image in the reference picture memory 109.

The loop filter 107 performs de-blocking filtering, SAO, and ALF on the decoded image generated by the addition portion 106. It should be noted that the loop filter 107 does not necessarily include the above three filters.

The prediction parameter memory 108 stores the prediction parameters generated by the encoding parameter determination portion 110 in a predefined position for each object picture and each CU.

The reference picture memory 109 stores the decoded image generated by the loop filter 107 in a predefined position for each object picture and each CU.

The encoding parameter determination portion 110 selects one of a plurality of sets of encoding parameters. The encoding parameters refer to the aforementioned QT, BT, or TT splitting information, prediction parameters, or parameters generated in association with the same and serving as encoding objects. The prediction image generation portion 101 uses these encoding parameters to generate the prediction image.

The encoding parameter determination portion 110 calculates a rate-distortion (RD) cost value for indicating an information size and the encoding error for each of a plurality of sets, and selects a set of encoding parameters having the smallest cost value. Therefore, the entropy encoding portion 104 uses the selected set of encoding parameters as the encoded stream Te, and outputs the same.

The encoding parameter determination portion 110 stores the determined encoding parameters in the prediction parameter memory 108.

It should be noted that a part of the moving image encoding device 11 and the moving image decoding device 31 in the above embodiment, for example, the entropy decoding portion 301, the parameter decoding portion 302, the loop filter 305, the prediction image generation portion 308, the inverse quantization/inverse transform portion 311, the addition portion 312, the prediction image generation portion 101, the subtraction portion 102, the transform/quantization portion 103, the entropy encoding portion 104, the inverse quantization/inverse transform portion 105, the loop filter 107, the encoding parameter determination portion 110, and the parameter encoding portion 111 can be implemented by means of a computer. In this case, it can be implemented by recording a program for implementing the control function in a computer-readable recording medium and causing a computer system to read and execute the program recorded in the recording medium. It should be noted that the described "computer system" refers to a computer system built in any one of the moving image encoding device 11 and the moving image decoding device 31 and including an operation system (OS) and hardware such as a peripheral apparatus. In addition, the "computer-readable recording medium" refers to a removable medium such as a floppy disk, a magneto-optical disk, a Read-Only Memory (ROM), and a Compact Disc Read-Only Memory (CD-ROM) and a storage device such as a hard disk built in the computer system. Moreover, the "computer-readable recording medium" may also include a recording medium for dynamically storing a program for a short time period such as a communication line used to transmit a program over a network such as the Internet or over a telecommunication line such as a telephone line, and may also include a recording medium for storing a program for a fixed time period such as a volatile memory in the computer system for functioning as a server or a client in such a case. In addition, the program described above may be a program for implementing a part of the functions described above, and may also be a program capable of implementing the functions described above in combination with a program already recorded in the computer system.

In addition, the moving image encoding device 11 and the moving image decoding device 31 in the above embodiment may be partially or completely implemented as integrated circuits such as Large-Scale Integration (LSI) circuits. The functional blocks of the moving image encoding device 11 and the moving image decoding device 31 may be individually implemented as processors, or may be partially or completely integrated into a processor. In addition, the circuit integration method is not limited to LSI, and the integrated circuits may be implemented as dedicated circuits or a general-purpose processor. In addition, with advances in semiconductor technology, a circuit integration technology with which LSI is replaced appears, and therefore an integrated circuit based on the technology may also be used.

An embodiment of the present invention has been described in detail above with reference to the accompanying drawings; however, the specific configuration is not limited to the above embodiment, and various amendments can be made to a design without departing from the scope of the gist of the present invention.

The moving image decoding device according to a solution of the present invention is a moving image decoding device for decoding encoded data of a tile group splitting a picture into one or more rectangular regions and consisting of one or more segments, characterized by including: a header decoding portion, wherein the header decoding portion decodes, from a tile group header, a number of tiles, a WPP enabled flag, and a slice enabled flag in an object tile group for indicating whether a segment in the object tile group is a rectangular tile, a CTU row having a height of one CTU, or a slice in units of CTUs, and the header decoding portion only decodes, in a tile group, any one of the number of tiles of two or more, the WPP enabled flag of 1, and the slice enabled flag of 1.

The moving image decoding device according to a solution of the present invention is characterized in that when the number of tiles of the object tile group is 1, the header decoding portion decodes the WPP enabled flag; when the number of tiles of the object tile group is 2 or more, the header decoding portion does not decode the WPP enabled flag and sets the WPP enabled flag to 0; when the WPP enabled flag is 1, after decoding the CTU at the right end of the CTU row, the CT information decoding portion decodes an end bit of a segment having a fixed value.

The moving image decoding device according to a solution of the present invention is characterized in that when the number of tiles of the object tile group is 1, the header decoding portion decodes the WPP enabled flag; when the number of tiles of the object tile group is 2 or more, the header decoding portion does not decode the WPP enabled flag and sets the WPP enabled flag to 0; when the WPP enabled flag is 1, after decoding the CTU at the right end of the CTU row, the CT information decoding portion decodes an end bit of a first segment having a fixed value; when the WPP enabled flag is 0, after decoding a CTU at the bottom right of a tile, the CT information decoding portion decodes an end bit of a second segment having a fixed value, the end bit of the first segment being different from the end bit of the second segment.

The moving image decoding device according to a solution of the present invention is characterized in that when the WPP enabled flag of the object tile group is 0, the header decoding portion decodes the number of tiles; when the WPP enabled flag of the object tile group is 1, the header decoding portion does not decode the number of tiles and sets the number of tiles to 1; when the WPP enabled flag is 1, after decoding the CTU at the right end of the CTU row, the CT information decoding portion decodes an end bit of a segment having a fixed value.

The moving image decoding device according to a solution of the present invention is characterized in that when the WPP enabled flag of the object tile group is 0, the header decoding portion decodes the number of tiles; when the WPP enabled flag of the object tile group is 1, the header decoding portion does not decode the number of tiles and sets the number of tiles to 1; when the WPP enabled flag is 1, after decoding the CTU at the right end of the CTU row, the CT information decoding portion decodes an end bit of a first segment having a fixed value; when the WPP enabled flag is 0, after decoding a CTU at the bottom right of a tile, the CT information decoding portion decodes an end bit of a second segment having a fixed value, the end bit of the first segment being different from the end bit of the second segment.

The moving image decoding device according to a solution of the present invention is characterized in that when the number of tiles of the object tile group is 1, the header decoding portion decodes the slice enabled flag; when the number of tiles of the object tile group is 2 or more, the header decoding portion does not decode the slice enabled flag and sets the slice enabled flag to 0; when the slice enabled flag is 1, after the CTU is decoded, the CT information decoding portion decodes the slice end flag.

The moving image decoding device according to a solution of the present invention is characterized in that when the slice enabled flag of the object tile group is 0, the header decoding portion decodes the number of tiles; when the slice end flag of the object tile group is 1, the header decoding portion does not decode the number of tiles and sets the number of tiles to be 1; when the slice enabled flag is 1, after the CTU is decoded, the CT information decoding portion decodes the slice end flag.

The moving image decoding device according to a solution of the present invention is characterized in that when the number of tiles of the object tile group is 1, the header decoding portion decodes the WPP enabled flag, and when the number of tiles of the object tile group is 2 or more, the header decoding portion does not decode the WPP enabled flag and sets the WPP enabled flag to 0, so that when the WPP enabled flag is 0, the header decoding portion decodes the slice enabled flag, and when the WPP enabled flag is 1, the header decoding portion does not decode the slice end flag and sets the slice end flag to be 0; and when the slice enabled flag is 1, after the CTU is decoded, the CT information decoding portion decodes the slice end flag.

The moving image decoding device according to a solution of the present invention is characterized in that when the WPP enabled flag of the object tile group is 0, the header decoding portion decodes the number of tiles, and when the WPP enabled flag of the object tile group is 1, the header decoding portion does not decode the number of tiles and sets the number of tiles to 1, so that when the number of tiles is 1, the header decoding portion decodes the slice enabled flag, and when the number of tiles is 2 or more, the header decoding portion does not decode the slice enabled flag and sets the slice enabled flag to 0; and when the slice enabled flag is 1, after the CTU is decoded, the CT information decoding portion decodes the slice ending flag.

Application Examples

The moving image encoding device 11 and the moving image decoding device 31 described above can be used in a state of being mounted on various devices for transmitting, receiving, recording, and reproducing a moving image. It should be noted that the moving image may be a natural moving image captured by a video camera or the like, or may be an artificial moving image (including CG and GUI) generated by means of a computer or the like.

Figure 2A:
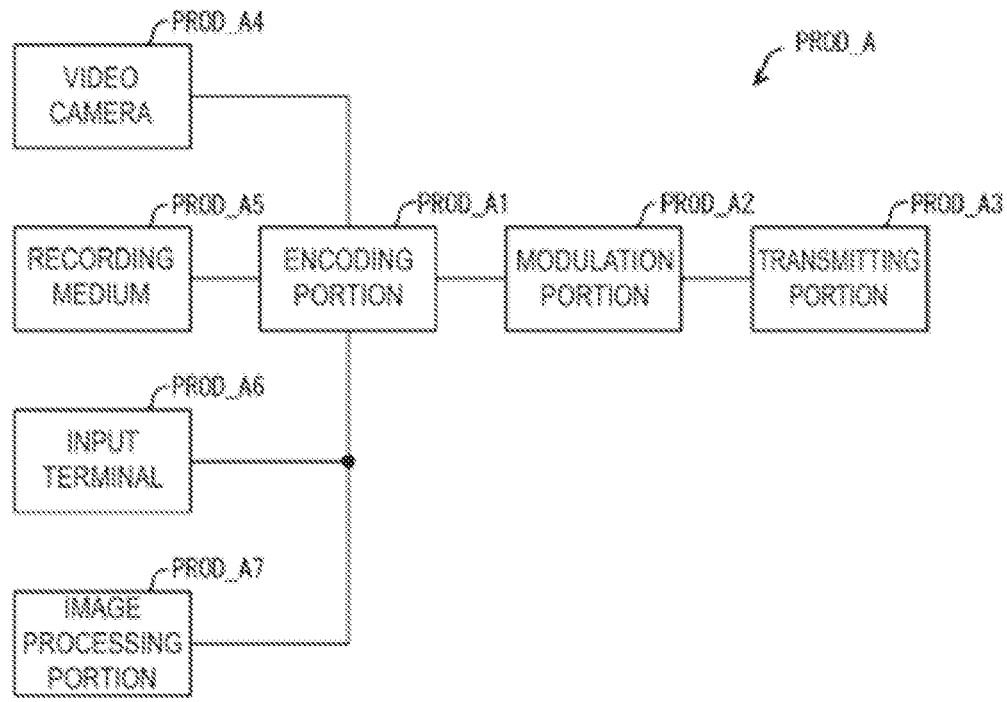
FIGS. 2A-2B are diagrams respectively showing components of a transmitting device equipped with a moving image encoding device and components of a receiving device equipped with a motion image decoding device according to example embodiments of the present disclosure.
Figure 2B:
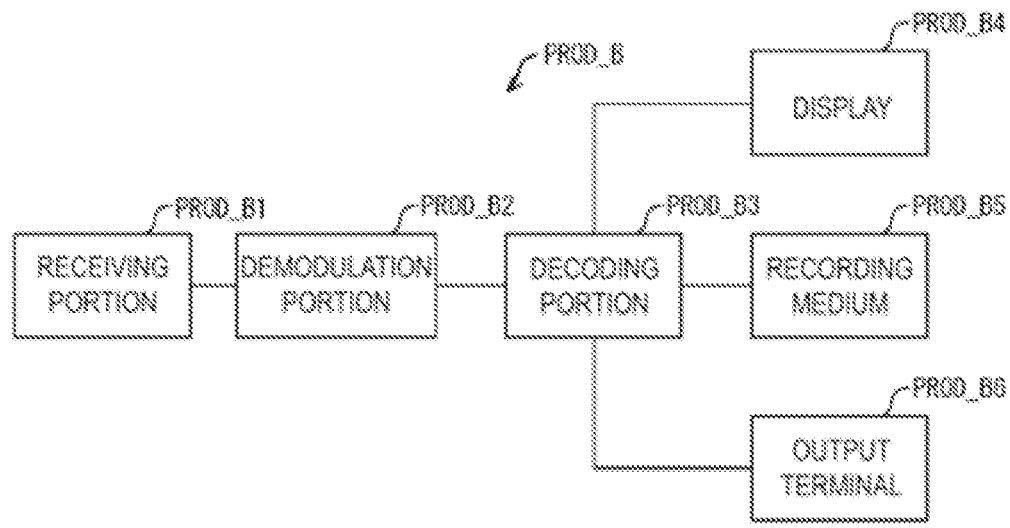

Firstly, with reference to FIGS. 2A-2B, a description of that the moving image encoding device 11 and the moving image decoding device 31 described above can be used to transmit and receive the moving image is provided. FIGS. 2A-2B are diagrams respectively showing components of a transmitting device equipped with a moving image encoding device and components of a receiving device equipped with a motion image decoding device according to example embodiments of the present disclosure.

FIG. 2A is a block diagram showing components of a transmitting device PROD_A equipped with the moving image encoding device 11 according to an example embodiment of the present disclosure. As shown in FIG. 2A, the transmitting device PROD_A includes: an encoding portion PROD_A1 for acquiring encoded data by encoding the moving image, a modulation portion PROD_A2 for acquiring a modulation signal by using the encoded data acquired by the encoding portion PROD_A1 to modulate a carrier, and a transmitting portion PROD_A3 for transmitting the modulation signal acquired by the modulation portion PROD_A2. The moving image encoding device 11 described above is used as the encoding portion PROD_A1.

As a source for providing the moving image inputted to the encoding portion PROD_A1, the transmitting device PROD_A may further include: a video camera PROD_A4 for capturing a moving image, a recording medium PROD_A5 on which the moving image is recorded, an input terminal PROD_A6 for inputting a moving image from the external, and an image processing portion A7 for generating or processing an image. FIG. 2A exemplarily shows that the transmitting device PROD_A includes all of these components, but a part of these components can be omitted.

It should be noted that the recording medium PROD_A5 may be a medium on which a moving image not encoded is recorded, or may be a medium on which a moving image encoded by using an encoding method for recording different from the encoding method for transmission is recorded. In the latter case, a decoding portion (not shown) for decoding, according to the encoding method for recording, the encoded data read from the recording medium PROD_A5 may be provided between the recording medium PROD_A5 and the encoding portion PROD_A1.

FIG. 2B is a block diagram showing components of a receiving device PROD_B equipped with the moving image decoding device 31 according to an example embodiment of the present disclosure. As shown in FIG. 2B, the receiving device PROD_B includes: a receiving portion PROD_B1 for receiving the modulation signal, a demodulation portion PROD_B2 for acquiring the encoded data by demodulating the modulation signal received by the receiving portion PROD_B1, and a decoding portion PROD_B3 for acquiring the moving image by decoding the encoded data acquired by the demodulation portion PROD_B2. The moving image decoding device 31 described above is used as the decoding portion PROD_B3.

The receiving device PROD_B serves as a destination of provision of the moving image outputted by the decoding portion PROD_B3, and may further include a display PROD_B4 for displaying the moving image, a recording medium PROD_B5 for recording the moving image, and an output terminal PROD_B6 for outputting the moving image to the external. FIG. 2B exemplarily shows that the receiving device PROD_B includes all of these components, but a part of these components can be omitted.

It should be noted that the recording medium PROD_B5 may be a medium on which a moving image not encoded is recorded, or may be a medium on which a moving image encoded by using an encoding method for recording different from the encoding method for transmission is recorded. In the latter case, an encoding portion (not shown) for encoding, according to the encoding method for recording, the moving image acquired from the decoding portion PROD_B3 may be provided between the decoding portion PROD_B3 and the recording medium PROD_B5.

It should be noted that a transmission medium for transmitting the modulation signal may be wireless or wired. In addition, a transmission scheme for transmitting the modulation signal may be broadcasting (here, referred to a transmission scheme of which the transmission destination is not determined in advance) or communication (here, referred to a transmission scheme of which the transmission destination is determined in advance). That is, transmission of the modulation signal may be implemented by means of any one of wireless broadcasting, wired broadcasting, wireless communication, and wired communication.

For example, a broadcast station (broadcast apparatus and the like)/receiving station (television receiver and the like) of digital terrestrial broadcasting is an example of the transmitting device PROD_A/receiving device PROD_B transmitting or receiving the modulation signal by means of wireless broadcasting. In addition, a broadcast station (broadcast apparatus and the like)/receiving station (television receiver and the like) of cable television broadcasting is an example of the transmitting device PROD_A/receiving device PROD_B transmitting or receiving the modulation signal by means of wired broadcasting.

In addition, a server (workstation and the like)/client (television receiver, personal computer, smart phone, and the like) using a Video On Demand (VOD) service and a moving image sharing service on the Internet is an example of the transmitting device PROD_A/receiving device PROD_B transmitting or receiving the modulation signal by means of communication (generally, a wireless or wired transmission medium is used in LAN, and a wired transmission medium is used in WAN). Here, the personal computer includes a desktop PC, a laptop PC, and a tablet PC. In addition, the smart phone also includes a multifunctional mobile phone terminal.

It should be noted that the client using the moving image sharing service has a function for decoding encoded data downloaded from the server and displaying the same on a display and a function for encoding a moving image captured by a video camera and uploading the same to the server. That is, the client using the moving image sharing service functions as both the transmitting device PROD_A and the receiving device PROD_B.

Figure 3A:
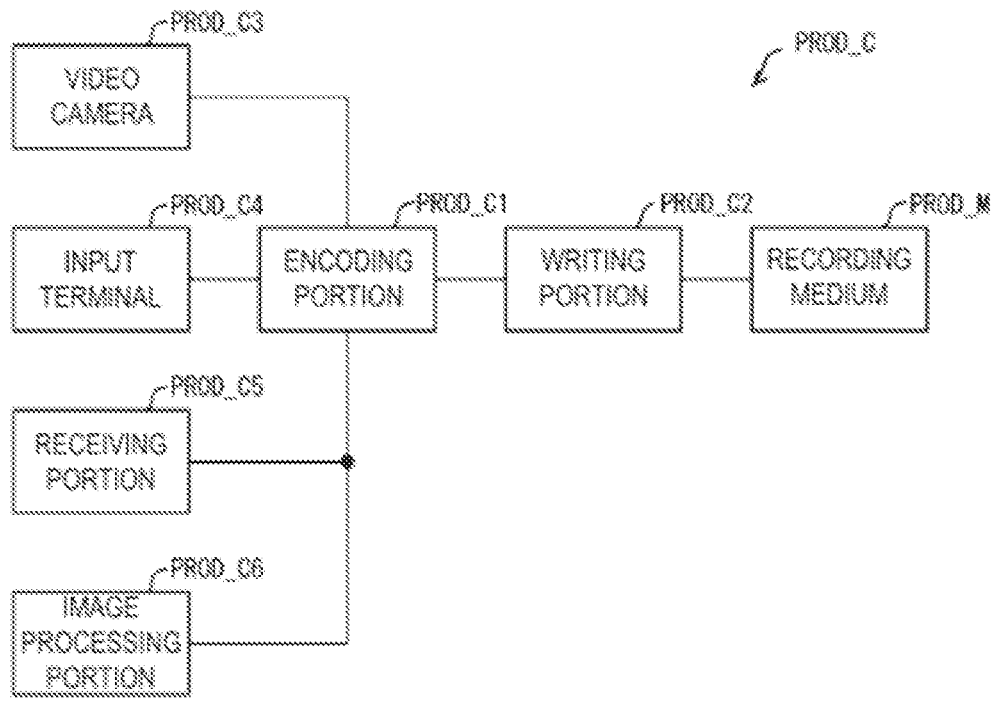
FIGS. 3A-3B are diagrams respectively showing components of a recording device equipped with a moving image encoding device and components of a reproducing device equipped with a moving image decoding device according to example embodiments of the present disclosure.
Figure 3B:
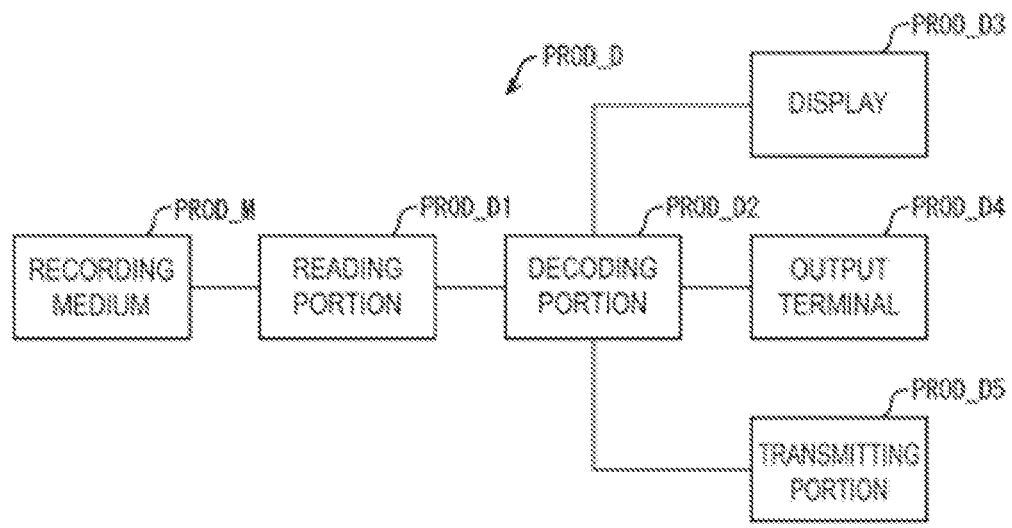

Next, with reference to FIGS. 3A-3B, a description of that the moving image encoding device 11 and the moving image decoding device 31 described above can be used to record and reproduce the moving image is provided. FIGS. 3A-3B are diagrams respectively showing components of a recording device equipped with a moving image encoding device and components of a reproducing device equipped with a moving image decoding device according to example embodiments of the present disclosure.

FIG. 3A is a block diagram showing components of a recording device PROD_C equipped with the moving image encoding device 11 described above according to an example embodiment of the present disclosure. As shown in FIG. 3A, the recording device PROD_C includes: an encoding portion PROD_C1 for acquiring encoded data by encoding the moving image and a writing portion PROD_C2 for writing the encoded data acquired by the encoding portion PROD_C1 in a recording medium PROD_M. The moving image encoding device 11 described above is used as the encoding portion PROD_C1.

It should be noted that the recording medium PROD_M may be (1) a recording medium built in the recording device PROD_C such as a Hard Disk Drive (HDD) and a Solid State Drive (SSD), may also be (2) a recording medium connected to the recording device PROD_C such as an SD memory card and a Universal Serial Bus (USB) flash memory, and may also be (3) a recording medium loaded into a drive device (not shown) built in the recording device PROD_C such as a Digital Versatile Disc (DVD, registered trademark) and a Blu-ray Disc (BD, registered trademark).

In addition, as a source for providing the moving image inputted to the encoding portion PROD_C1, the recording device PROD_C may further include: a video camera PROD_C3 for capturing a moving image, an input terminal PROD_C4 for inputting a moving image from the external, a receiving portion PROD_C5 for receiving a moving image, and an image processing portion PROD_C6 for generating or processing an image. FIG. 3A exemplarily shows that the recording device PROD_C includes all of these components, but a part of these components can be omitted.

It should be noted that the receiving portion PROD_C5 can receive an un-encoded moving image, and can also receive encoded data encoded by using an encoding method for transmission different from the encoding method for recording. In the latter case, a decoding portion for transmission (not shown) for decoding the encoded data encoded by using the encoding method for transmission may be provided between the receiving portion PROD_C5 and the encoding portion PROD_C1.

Examples of such recording device PROD_C include: a DVD recorder, a BD recorder, a Hard Disk Drive (HDD) recorder, etc. (in this case, the input terminal PROD_C4 or the receiving portion PROD_C5 is a main source for providing the moving image). In addition, a portable video camera (in this case, the video camera PROD_C3 is the main source for providing the moving image), a personal computer (in this case, the receiving portion PROD_C5 or the image processing portion C6 is the main source for providing the moving image), and a smart phone (in this case, the video camera PROD_C3 or the receiving portion PROD_C5 is the main source for providing the moving image) are also included in the examples of such recording device PROD_C.

FIG. 3B is a block diagram showing components of a reproducing device PROD_D equipped with the moving image decoding device 31 described above according to an example embodiment of the present disclosure. As shown in FIG. 3B, the reproducing device PROD_D includes: a reading portion PROD_D1 for reading the encoded data having been written in the recording medium PROD_M and a decoding portion PROD_D2 for acquiring the moving image by decoding the encoded data read by the reading portion PROD_D1. The moving image decoding device 31 described above is used as the decoding portion PROD_D2.

It should be noted that the recording medium PROD_M may be (1) a recording medium built in the reproducing device PROD_D such as an HDD and an SSD, may also be (2) a recording medium connected to the reproducing device PROD_D such as an SD memory card and a USB flash memory, and may also be (3) a recording medium loaded into a drive device (not shown) built in the reproducing device PROD_D such as a DVD and a BD.

In addition, as a destination of provision of the moving image outputted by the decoding portion PROD_D2, the reproducing device PROD_D may further include: a display PROD_D3 for displaying the moving image, an output terminal PROD_D4 for outputting the moving image to the external, and a transmitting portion PROD_D5 for transmitting the moving image. FIG. 3B exemplarily shows that the reproducing device PROD_D includes all of these components, but a part of these components can be omitted.

It should be noted that the transmitting portion PROD_D5 can transmit an un-encoded moving image, and can also transmit encoded data encoded by using an encoding method for transmission different from the encoding method for recording. In the latter case, an encoding portion (not shown) for encoding the moving image by using the encoding method for transmission may be provided between the decoding portion PROD_D2 and the transmitting portion PROD_D5.

Examples of such reproducing device PROD_D include a DVD player, a BD player, an HDD player, and the like (in this case, the output terminal PROD_D4 connected to a television receiver and the like is a main destination of provision of the moving image). In addition, a television receiver (in this case, the display PROD_D3 is the main destination of provision of the moving image), a digital signage (also referred to as an electronic signage or an electronic bulletin board, and the display PROD_D3 or the transmitting portion PROD_D5 is the main destination of provision of the moving image), a desktop PC (in this case, the output terminal PROD_D4 or the transmitting portion PROD_D5 is the main destination of provision of the moving image), a laptop or tablet PC (in this case, the display PROD_D3 or the transmitting portion PROD_D5 is the main destination of provision of the moving image), and a smart phone (in this case, the display PROD_D3 or the transmitting portion PROD_D5 is the main destination of provision of the moving image) are also included in the examples of such reproducing device PROD_D.

(Hardware Implementation and Software Implementation)

In addition, the blocks in the moving image decoding device 31 and the moving image encoding device 11 described above may be implemented by hardware by using a logic circuit formed on an integrated circuit (IC chip), or may be implemented by software by using a Central Processing Unit (CPU).

In the latter case, the devices described above include: a CPU for executing commands of a program for implementing the functions, a Read-Only Memory (ROM) for storing the program, a Random-Access Memory (RAM) for loading the program, and a storage device (storage medium) such as a memory for storing the program and various data. The objective of the embodiments of the present invention can be attained by performing the following: software for implementing the functions described above, namely program code of a control program for the above devices (executable program, intermediate code program, source program), is recoded in a recording medium in a computer-readable manner, the recording medium is provided to the above devices, and the computer (or CPU or MPU) reads the program code recorded in the recording medium and executes the same.

Examples of the recording medium described above include: tapes such as a magnetic tape and a cassette tape, disks or discs including a magnetic disk such as a floppy disk (registered trademark)/hard disk and an optical disc such as a Compact Disc Read-Only Memory (CD-ROM)/Magneto-Optical (MO) disc/Mini Disc (MD)/Digital Versatile Disc (DVD)/CD Recordable (CD-R)/Blu-ray Disc (registered trademark), cards such as an IC card (including a memory card)/optical card, semiconductor memories such as a mask ROM/Erasable Programmable Read-Only Memory (EPROM)/Electrically Erasable and Programmable Read-Only Memory (EEPROM)/flash ROM, or logic circuits such as a Programmable logic device (PLD) and a Field-Programmable Gate Array (FPGA).

In addition, the devices described above may also be configured to be connectable to a communication network and to be provided with the above program code by means of the communication network. The communication network is not specifically limited as long as the program code can be transmitted. For example, the Internet, an intranet, an extranet, a local area network (LAN), an Integrated Services Digital Network (ISDN), a value-added network (VAN), a community antenna television/cable television (CATV) communication network, a virtual private network, a telephone network, a mobile communication network, a satellite communication network, and the like can be used. In addition, transmission media forming the communication network are not limited to a specific configuration or type as long as the program code can be transmitted. For example, a wired medium such as Institute of Electrical and Electronic Engineers (IEEE) 1394, a USB, a power-line carrier, a cable TV line, a telephone line, and an Asymmetric Digital Subscriber Line (ADSL) or a wireless medium such as an infrared-ray including the Infrared Data Association (IrDA) and a remote controller, Bluetooth (registered trademark), IEEE 802.11 wireless communication, High Data Rate (HDR), near-field communication (NFC), Digital Living Network Alliance (DLNA, registered trademark), a mobile telephone network, a satellite circuit, and a terrestrial digital broadcast network can also be used. It should be noted that the embodiments of the present invention may also be implemented in a form of a computer data signal embedded in a carrier wave in which the above program code is embodied by electronic transmission.

Embodiments of the present invention can be preferably applied to a moving image decoding device for decoding encoded data acquired by encoding image data and a moving image encoding device for generating encoded data acquired by encoding image data. In addition, embodiments of the present invention can be preferably applied to a data structure of the encoded data generated by the moving image encoding device and referred to by the moving image decoding device.

The embodiments of the present invention are not limited to the above embodiments, and can be variously modified within the scope of the claims. That is, embodiments acquired by combining technical solutions which are adequately modified within the scope of the claims are also included in the technical scope of the present invention.

What is claimed is:

1. A moving image decoding method for decoding encoded data of a tile group generated by splitting a picture into one or more rectangular regions, the tile group comprising one or more segments, the moving image decoding method comprising:
    decoding a wavefront parallel processing (WPP) enabled flag indicating whether a rectangular tile or a coding tree unit (CTU) row having a height of one CTU exists in a segment in an object tile group; and
    decoding an end bit of the segment,
    wherein:
    when the WPP enabled flag is 1, after decoding a CTU at a right end of the CTU row, an end bit of a first segment having a first fixed value is decoded, and
    when the WPP enabled flag is 0, after decoding a CTU at a bottom right of a tile, an end bit of a second segment having a second fixed value is decoded.

2. The moving image decoding method according to claim 1, wherein the end bit of the first segment is equal to the end bit of the second segment.

3. The moving image decoding method according to claim 1, wherein the end bit of the second segment and the end bit of the first segment are both equal to one.

4. A moving image encoding method for encoding data of a tile group generated by splitting a picture into one or more rectangular regions, the tile group comprising one or more segments, the moving image encoding method comprising:
    encoding a wavefront parallel processing (WPP) enabled flag indicating whether a rectangular tile or a coding tree unit (CTU) row having a height of one CTU exists in a segment in an object tile group; and
    encoding an end bit of the segment, wherein when the WPP enabled flag is 1, after encoding a CTU at a right end of the CTU row, an end bit of a first segment having a first fixed value is encoded, and when the WPP enabled flag is 0, after encoding a CTU at a bottom right of a tile, an end bit of a second segment having a second fixed value is encoded.

5. The moving image encoding method according to claim 4, wherein the end bit of the first segment is equal to the end bit of the second segment.

6. The moving image encoding method according to claim 4, wherein the end bit of the second segment and the end bit of the first segment are both equal to one.

7. A moving image decoding method for decoding encoded data of a tile group generated by splitting a picture into one or more rectangular regions, the tile group comprising one or more segments, the moving image decoding method comprising:

when an object tile group uses wavefront parallel processing (WPP), decoding an end bit and a byte alignment of a first segment at an end of a coding tree unit (CTU) row; and when the object tile group does not use the WPP, decoding an end bit and a byte alignment of a second segment at an end of a tile.

8. The moving image decoding method according to claim 7, wherein the end bit of the first segment is equal to the end bit of the second segment.

9. The moving image decoding method according to claim 7, wherein the end bit of the second segment and the end bit of the first segment are both equal to one.

\* \* \* \* \*